US012672024B2

(12) United States Patent
Teyeb et al.

(10) Patent No.: US 12,672,024 B2
(45) Date of Patent: Jun. 30, 2026

(54) ENFORCING PACKET DELAY BUDGETS ASSOCIATED WITH MULTI-HOP IAB

(71) Applicant: InterDigital Patent Holdings, Inc., Wilmington, DE (US)

(72) Inventors: Oumer Teyeb, Montreal (CA); Martino M. Freda, Laval (CA); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 293 days.

(21) Appl. No.: 18/285,221

(22) PCT Filed: Mar. 29, 2022

(86) PCT No.: PCT/US2022/022339
§ 371 (c)(1),
(2) Date: Sep. 29, 2023

(87) PCT Pub. No.: WO2022/212369
PCT Pub. Date: Oct. 6, 2022

(65) Prior Publication Data
US 2024/0196262 A1 Jun. 13, 2024

Related U.S. Application Data

(60) Provisional application No. 63/304,291, filed on Jan. 28, 2022, provisional application No. 63/185,849, (Continued)

(51) Int. Cl.
*H04W 28/02* (2009.01)
*H04L 47/215* (2022.01)
(Continued)

(52) U.S. Cl.
CPC ....... *H04W 28/0268* (2013.01); *H04L 47/215* (2013.01); *H04W 28/08* (2013.01); *H04W 72/02* (2013.01)

(58) Field of Classification Search
None
See application file for complete search history.

(56) References Cited

U.S. PATENT DOCUMENTS

| | | | |
|---|---|---|---|
| 10,313,947 B1 | 6/2019 | Sung et al. | |
| 11,601,851 B2 * | 3/2023 | Nguyen | ............ H04W 72/0446 |

(Continued)

FOREIGN PATENT DOCUMENTS

GB 2574875 A 12/2019

OTHER PUBLICATIONS

3rd Generation Partnership Project (3GPP), R2-151367, "Scheduling problem with UL split bearer", 3GPP TSG-RAN2 #89bis Meeting, MeditaTek Inc., Bratislava, Slovakia, Apr. 20-24, 2015, 3 pages.

(Continued)

*Primary Examiner* — Eunsook Choi
(74) *Attorney, Agent, or Firm* — Condo Roccia Koptiw LLP

(57) ABSTRACT
A device may transmit data to a first parent node via a first link and to a second parent node via a second link. The device may receive configuration information indicating at least one of: a first buffer threshold associated with a first remaining packet delay budget (PDB), a second buffer threshold associated with a second remaining PDB, or a remaining PDB threshold. The device may receive a packet and may determine a remaining PDB. The device may select a buffer threshold based on the configuration information and the determined remaining PDB. If an amount of data in an uplink (UL) buffer is equal to or above the selected buffer
(Continued)

threshold, the device may transmit the packet via a first available link. If the determined remaining PDB is less than the remaining PDB threshold, the device may transmit the packet via both the first link and the second link.

20 Claims, 8 Drawing Sheets

Related U.S. Application Data filed on May 7, 2021, provisional application No. 63/169,570, filed on Apr. 1, 2021.

(51) Int. Cl.
*H04W 28/08* (2023.01)
*H04W 72/02* (2009.01)

(56) References Cited

U.S. PATENT DOCUMENTS

| | | | | |
|---|---|---|---|---|
| 11,950,124 | B2 * | 4/2024 | Chen | H04W 28/0263 |
| 12,075,473 | B2 * | 8/2024 | Sarkis | H04W 74/0808 |
| 12,101,799 | B2 * | 9/2024 | Hui | H04W 72/20 |
| 12,127,222 | B2 * | 10/2024 | Ye | H04W 72/40 |
| 2017/0116213 | A1 * | 4/2017 | Jain | G06F 16/2365 |
| 2021/0314965 | A1 * | 10/2021 | Hui | H04W 72/20 |

OTHER PUBLICATIONS

3rd Generation Partnership Project (3GPP), R2-165899, "Report of email discussion [94#28] [LTE/eLWA] UL transmission (Nokia)", 3GPP TSG-RAN WG2 Meeting #95, Nokia (Rapporteur), Goteborg, Sweden, Aug. 22-28, 2016, 17 pages.
3rd Generation Partnership Project (3GPP), R2-1707364, "Threshold for NR UL data split operation", 3GPP TSG-RAN WG2 NR AdHoc, Sequans Communications, Qingdao, China, Jun. 27-29, 2017, 5 pages.
3rd Generation Partnership Project (3GPP), R2-2102601, "Report of 3GPP TSG RAN WG2 meeting #113-e, Online", ETSI MCC, 3GPP TSG-RAN WG2 meeting #113bis-e, Jan. 25-Feb. 5, 2021, 373 pages.
3rd Generation Partnership Project (3GPP), TR 38.874 V16.0.0, "Technical Specification Group Radio Access Network, NR, Study on Integrated Access and Backhaul, (Release 16)", Dec. 2018, pp. 1-111.
3rd Generation Partnership Project (3GPP), TS 38.300 V16.2.0, "Technical Specification Group Radio Access Network, NR, NR and NG-RAN Overall Description, Stage 2 (Release 16)", Jul. 2020, pp. 1-148.
3rd Generation Partnership Project (3GPP), TS 38.331 V16.2.0, "Technical Specification Group Radio Access Network, NR, Radio Resource Control (RRC) Protocol Specification (Release 16)", Sep. 2020, pp. 1-921.
3rd Generation Partnership Project (3GPP), TS 38.340 V16.2.0, "Technical Specification Group Radio Access Network, NR, Backhaul Adaptation Protocol (BAP) Specification (Release 16)", Sep. 2020, pp. 1-22.

* cited by examiner

IAB User Plane

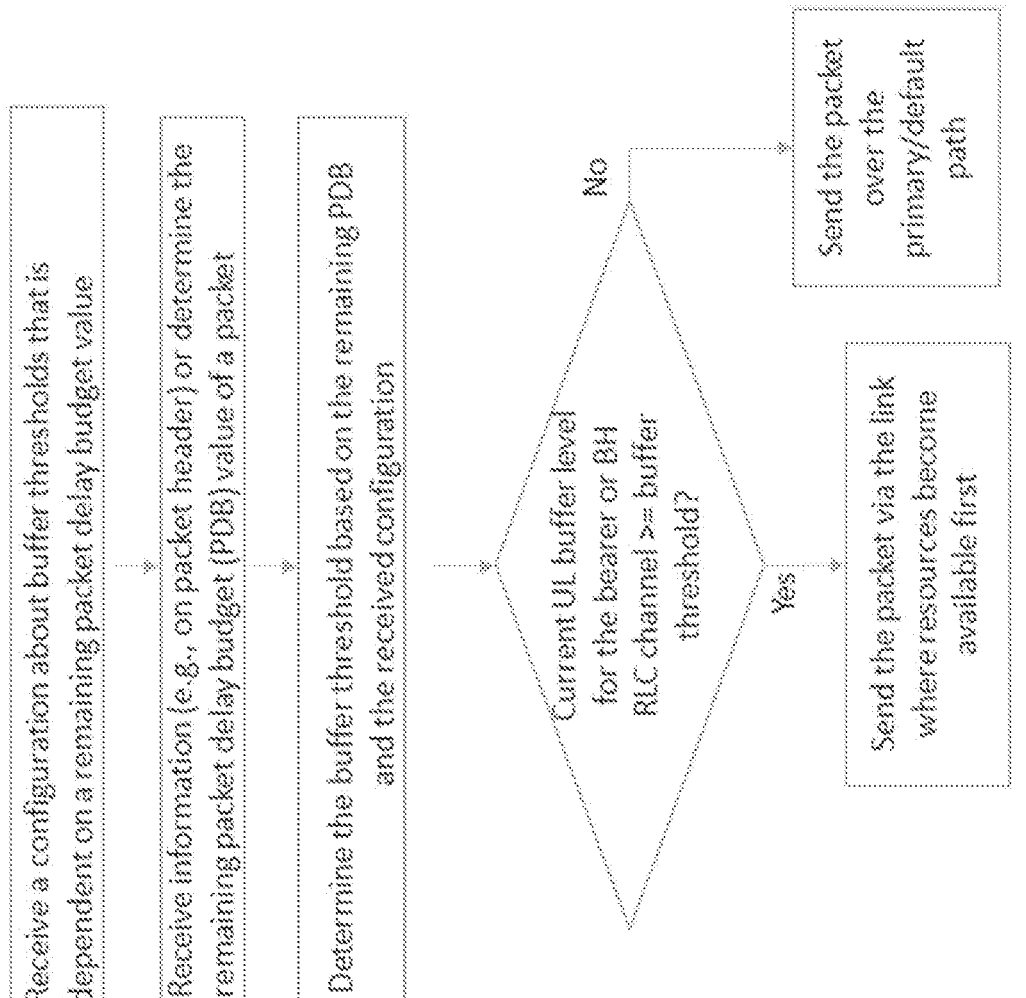

Receive a configuration about buffer thresholds that is dependent on a remaining packet delay budget value Receive information (e.g., on packet header) or determine the remaining packet delay budget (PDB) value of a packet Determine the buffer threshold based on the remaining PDB and the received configuration Current UL buffer level for the bearer or BH RLC channel >= buffer threshold?

No → Send the packet over the primary/default path

Yes → Send the packet via the link where resources become available first

FIG. 4

Configuration of buffer thresholds that are dependent/associated to the remaining PDB

ENFORCING PACKET DELAY BUDGETS ASSOCIATED WITH MULTI-HOP IAB

CROSS-REFERENCE TO RELATED APPLICATIONS

This application is the National Stage Entry under 35 U.S.C. § 371 of Patent Cooperation Treaty Application No. PCT/US2022/022339, filed Mar. 29, 2022, which claims the benefit of Provisional U.S. Patent Application No. 63/169,570, filed Apr. 1, 2021, Provisional U.S. Patent Application No. 63/185,849, filed May 7, 2021, and Provisional U.S. Patent Application No. 63/304,291, filed Jan. 28, 2022, as if fully set forth.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for enforcing packet delay budgets in multi-hop integrated access and backhaul (IAB).

A device may transmit data to a first parent node via a first link and to a second parent node via a second link. The first link may be a default link and the second link may be a secondary link. The device may be an IAB node or a wireless transmit/receive unit (WTRU). The device may be a MT part of the IAB node or a DU part of the IAB node. The WTRU may operate in a multi-hop IAB node. The device may receive configuration information. The confirmation information may be associated with a bearer or a backhaul radio link control (BH RLC) channel. The configuration information may indicate a first buffer threshold and a second buffer threshold. The first buffer threshold may be associated with a first remaining packet delay budget (PDB) range and the second buffer threshold may be associated with a second remaining PDB range. The first remaining PDB range may be below a value and the second remaining PDB range may be above the value. The device may receive a packet and may determine a remaining PDB associated with the packet. The device may select a buffer threshold based on the configuration information and the determined remaining PDB associated with the packet. The selected buffer threshold may be the first buffer threshold or the second buffer threshold. If an amount of data in an uplink (UL) buffer associated with the bearer or the BH RLC channel is equal to or above the selected buffer threshold, the device may transmit the packet via a first available link. The first available link may be a link, of the first or second links, on which a resource becomes available first.

A device may transmit data to a first parent node via a first link and to a second parent node via a second link. The first link may be a default link and the second link may be a secondary link. The device may be an IAB node or WTRU. The device may be a MT part of the IAB node or a DU part of the IAB node. The WTRU may operate in a multi-hop IAB node. The device may receive configuration information. The received configuration information may be associated with a bearer or a backhaul radio link control (BH RLC) channel. The configuration information may indicate a remaining PDB threshold. The device may receive a packet and may determine a remaining PDB associated with the packet. If the determined remaining PDB associated with the packet is less than the remaining PDB threshold, the device may transmit the packet via both the first link and the second link. The device may send a schedule request (SR) or a buffer status report (BSR) to the first parent node if resources are not available on the first link. The device may send an SR or BSR to the second parent node if resources are not available on the second link.

BRIEF DESCRIPTION OF THE DRAWINGS

FIG. 4 illustrates an example of a split buffer thresholds (e.g., multiple buffer thresholds) that are associated with a remaining PDB.

DETAILED DESCRIPTION

Figure 1A:
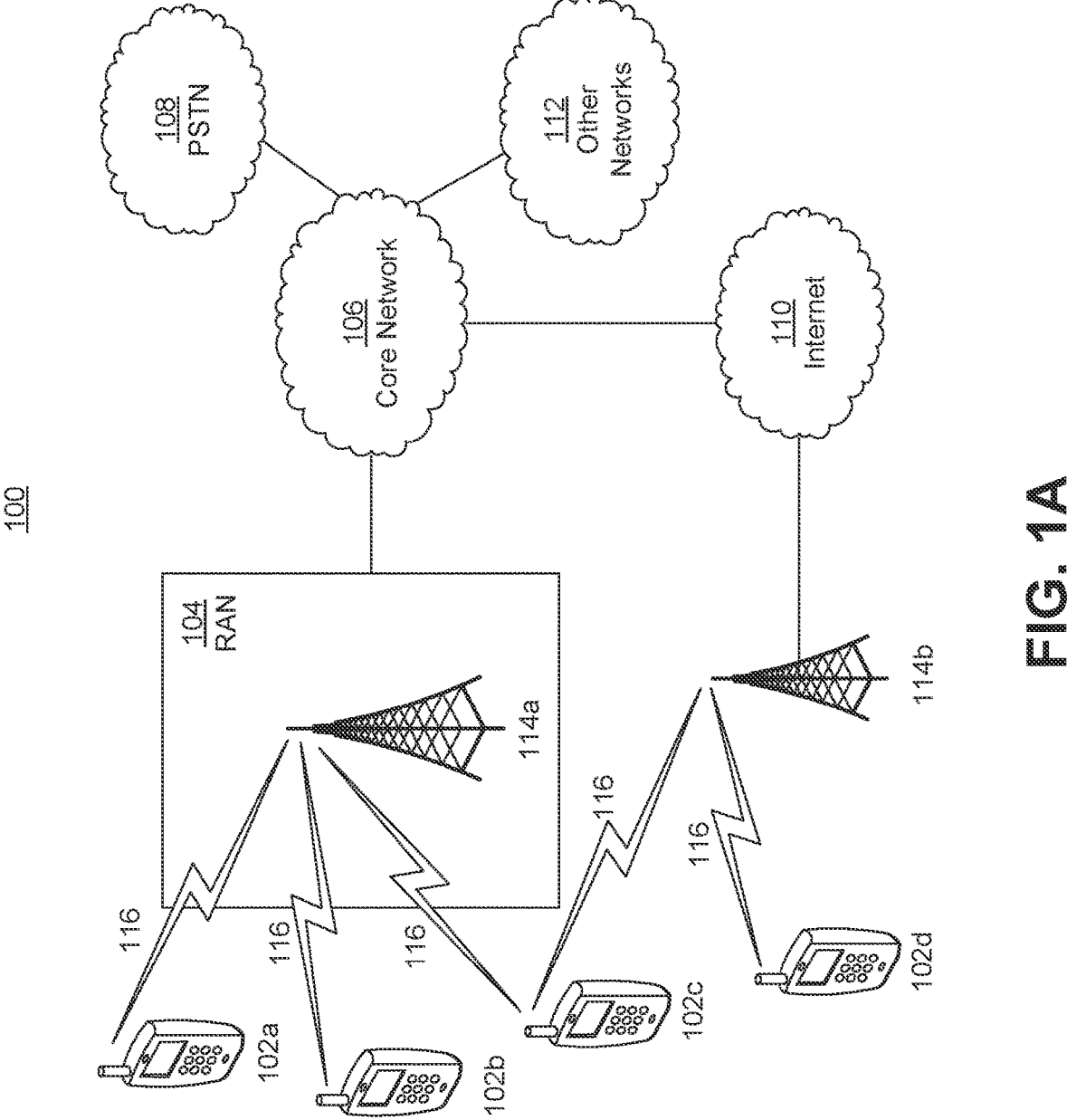
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs

102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
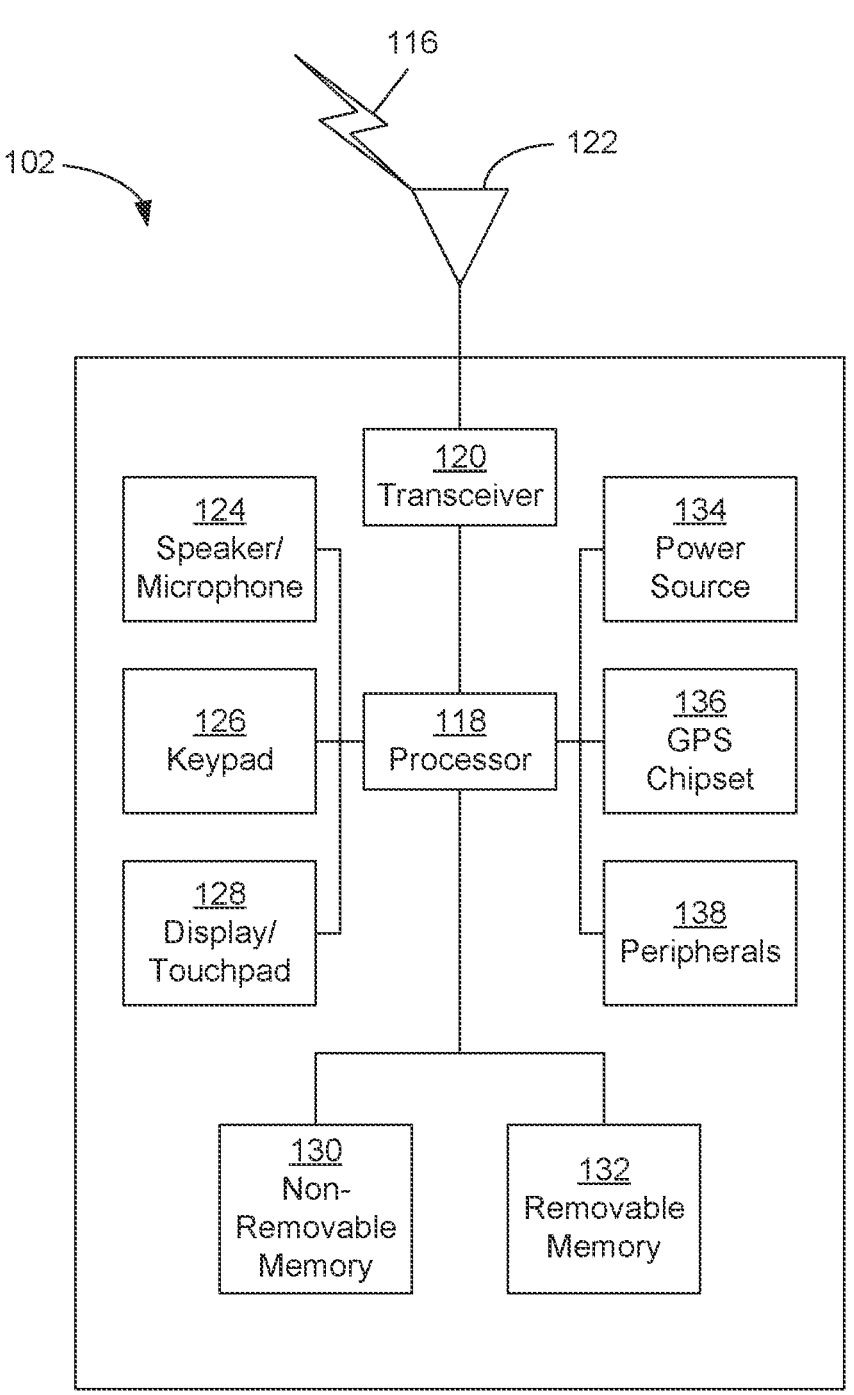
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
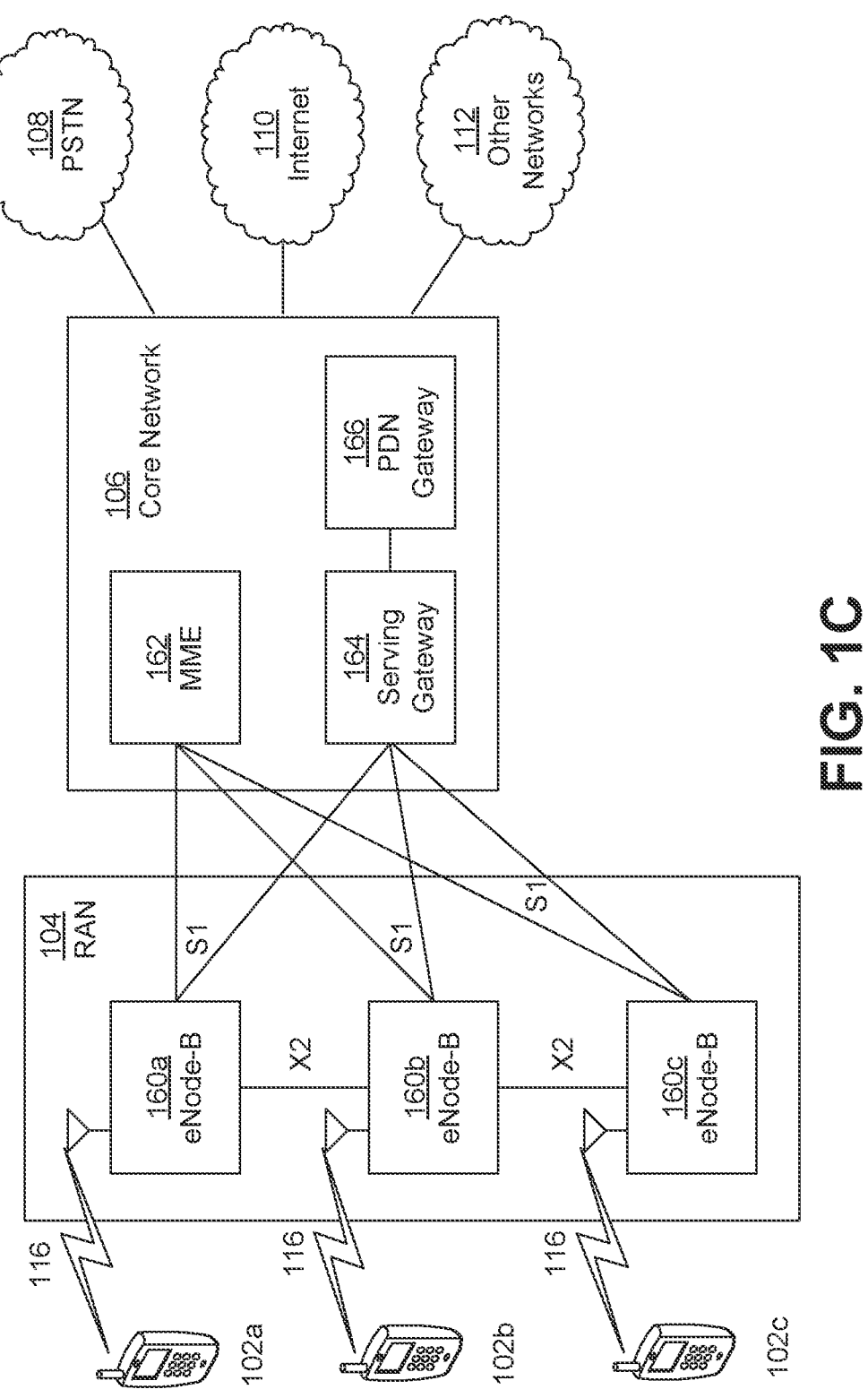
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
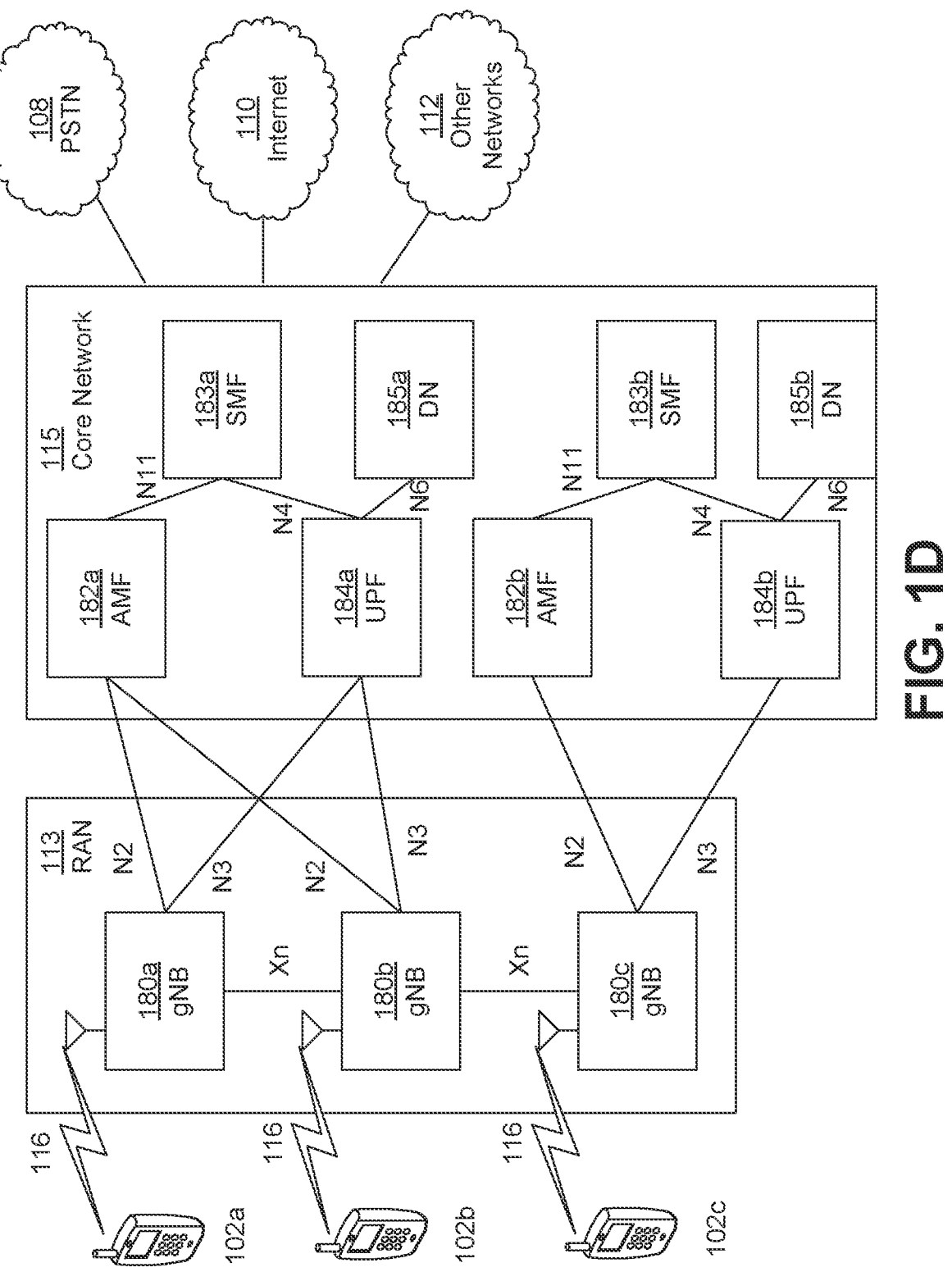
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Reference to a timer herein may refer to determination of a time or determination of a period of time. Reference to a timer expiration herein may refer to determining that the time has occurred or that the period of time has expired. Reference to a timer herein may refer to a time, a time period, tracking the time, tracking the period of time, etc. Reference to a timer expiration herein may refer to determining that the time has occurred or that the period of time has expired. Reference to a legacy technology or legacy handover, may indicate a legacy technology such as LTE compared to NR, or, a legacy version of a technology, for example an earlier version/release of a technology (e.g., earlier NR release) compared to a later version/release of the technology (e.g., later NR release).

Systems, methods, and instrumentalities are described herein for enforcing packet delay budgets in multi-hop integrated access and backhaul (IAB).

A device may transmit data to a first parent node via a first link and to a second parent node via a second link. The first link may be a default link and the second link may be a secondary link. The device may be an IAB node or a wireless transmit/receive unit (WTRU). The device may receive configuration information. The confirmation information may be associated with a bearer or a backhaul radio link control (BH RLC) channel. The configuration information may indicate a first buffer threshold and a second buffer threshold. The first buffer threshold may be associated with a first remaining packet delay budget (PDB) range and the second buffer threshold may be associated with a second remaining PDB range. The first remaining PDB range may be below a value and the second remaining PDB range may be above the value. The device may receive a packet and may determine a remaining PDB associated with the packet.

The device may select a buffer threshold based on the configuration information and the determined remaining PDB associated with the packet. The selected buffer threshold may be the first buffer threshold or the second buffer threshold. If an amount of data in an uplink (UL) buffer associated with the bearer or the BH RLC channel is equal to or above the selected buffer threshold, the device may transmit the packet via a first available link. The first available link may be a link, of the first or second links, on which a resource becomes available first.

A device may transmit data to a first parent node via a first link and to a second parent node via a second link. The first link may be a default link and the second link may be a secondary link. The device may be an IAB node or WTRU. The device may receive configuration information. The received configuration information may be associated with a bearer or a backhaul radio link control (BH RLC) channel. The configuration information may indicate a remaining PDB threshold. The device may receive a packet and may determine a remaining PDB associated with the packet. If the determined remaining PDB associated with the packet is less than the remaining PDB threshold, the device may transmit the packet via both the first link and the second link. The device may send a schedule request (SR) or a buffer status report (BSR) to the first parent node if resources are not available on the first link. The device may send an SR or BSR to the second parent node if resources are not available on the second link.

IAB nodes (e.g., donor distributed units (DUs)) or WTRUs may be configured with information regarding hop by hop (H2H) and end-to-end (E2E) PDBs of packets/bearers. IAB nodes, donor DUs, or WTRUs may be configured to determine and aggregate packet on-flight time and include the information if forwarding the packet to a parent node, a child node, or a WTRU. IAB nodes, donor DUs, or WTRUs may be configured to determine and include the remaining PDB information of packets if forwarding the packet to a parent node, a child node, or a WTRU. IAB nodes, donor DUs, or WTRUs may be configured to report (e.g., periodically, on the fulfillment of certain conditions, etc.) the per-hop latency information/status towards parent nodes, child nodes, the WTRU, or the centralized unit (CU). IAB nodes, donor DUs, or WTRUs may be configured to determine the remaining latency from themselves to the donor (e.g., in the uplink (UL)) and the WTRU (e.g., in the downlink (DL)), possibly via multiple paths (e.g., via multiple links), based on the per hop latency information/report they are getting from their child nodes, parent nodes, or the WTRU.

IAB nodes, donor DUs, or WTRUs may be configured to drop a packet if the PDB has elapsed (e.g., already elapsed) or the packet is not expected to reach the WTRU/CU before the PDB expires. IAB nodes or donor DUs may be configured to schedule packets with shorter remaining PDBs in the DL over the path that has the lowest expected latency (e.g., if there are multiple paths or links available). In examples, IAB nodes or donor DUs may be configured to attempt to get scheduled on the path with the lowest expected UL latency for packets that have shorter remaining PDB (e.g., and may send status report (SR)/buffer status reporting (BSR) related to those packets towards the parent node on the lower latency path). In examples, IAB nodes may construct or update the BAP header information (e.g., remaining PDB, elapsed flight time) and forward the BAP header information to the RLC/MAC if the MAC is ready to send data on the UL or DL.

IAB nodes or WTRUs may be configured to use different UL split buffer thresholds (e.g., multiple buffer thresholds, such as a first buffer threshold and a second buffer threshold). The UL split buffer thresholds (e.g., multiple buffer thresholds, such as the first buffer threshold and the second buffer threshold) may be dependent on a remaining PDB (e.g., a remaining PDB range) of packet(s) (e.g., the first buffer threshold may be associated with a first remaining PDB range and the second buffer threshold may be associated with a second remaining PDB range). IAB nodes or WTRUs may be configured to perform UL packet duplication depending on the remaining PDB (e.g., remaining PDB range) of packets.

IAB nodes or WTRUs may be enabled to have information about end-to-end (E2E) PDBs. An IAB node (e.g., a mobile termination (MT) part of the IAB node and/or a distributed unit (DU) part of the IAB node) or a WTRU (e.g., operating in a multi-hop IAB node) may receive configuration information, e.g., from the network. The configuration information may include information related to PDB(s) associated with backhaul radio link control (BH RLC) channel(s). The information related to the PDBs may include information related to per hop PDB(s) and/or information related to E2E PDB(s). For 1:1 mapped BH RLC channels, the E2E PDB information may include: a single value applicable to both UL and DL packets; separate values for UL and DL packets; and/or a range of values (e.g., PDB1=preferred value, PDB2=absolute maximum allowed, etc.). For N:1 mapped BH RLC channels, the E2E PDB information may include: a range of values summarizing the E2E PDBs of bearers (e.g., all the bearers) multiplexed over that BH RLC channel (e.g., min PDB, max PDB, mean PDB, etc.); a range of values applicable to UL and DL packets (e.g., both UL and DL packets); and/or a separate range of values applicable to UL and DL packets.

IAB nodes or WTRUs may be enabled to determine/include information about a packet's on-flight time. An IAB node (e.g., MT part of the IAB node and/or DU part of the IAB node) or a WTRU (e.g., operating in a multi-hop IAB node) may receive a media access control packet data unit (MAC PDU) from a first network node (e.g., a child node or WTRU (in the UL)) or a second network node (e.g., a parent node (in the DL)), where the MAC PDU includes one or more multiplexed packets belonging to bearers (e.g., multiple bearers). In the MAC PDU and/or the one or more backhaul adaptation protocol (BAP) PDUs that are multiplexed within the MAC PDU, the IAB node or the WTRU may receive information regarding how long the packet(s) have been on flight. The IAB node or WTRU (e.g., as part of passing the packets to the next hop) may construct the corresponding BAP packets, may multiplex them over a MAC PDU, and may add, on top of the on-flight time values that were indicated when the packets were received, at least one of: a processing delay at the IAB node; or a latency over the air interface between the IAB node and/or the node/WTRU where the packet was received from (e.g., including time for retransmissions, if any). The IAB node or WTRU may send the MAC PDUs over to the next hop.

IAB nodes or WTRUs may be enabled to determine/include information about a packet's remaining PDB. An IAB node (MT part of the IAB node and/or DU part of the IAB node) or a WTRU (e.g., operating in a multi-hop IAB node) may perform one or more of the following. The IAB node or WTRU may receive a MAC PDU from a first network node (e.g., a child node or WTRU (in the UL)) or a second network node (e.g., parent node (in the DL)), where the MAC PDU may include multiplexed packet(s). In examples, the MAC PDU may include multiple multiplexed packets belonging to multiple bearers (e.g., a respective packet of the multiple multiplexed packets may belong to a respective bearer). In the MAC PDU and/or the one or more BAP PDUs that are multiplexed within the MAC PDU, the IAB node or WTRU may receive information regarding how long the packet(s) have been on flight and information regarding the remaining PDB for the packet. The IAB node or WTRU (e.g., as a part of passing the packets to the next hop) may construct the corresponding BAP packets, may multiplex them over a MAC PDU, may update the remaining PDB by subtracting the delay values that were indicated when the packets were received, and/or may add one or more of the following: the processing delay at the IAB node or WTRU; or the latency over the air interface between the IAB node and the node/WTRU where the packet was received from (e.g., including time for retransmissions, if any). The IAB node or WTRU may send the MAC PDUs over the next hop.

IAB nodes or WTRUs may receive, determine, and/or send information about expected remaining delay for packets (e.g., latency measurement reports). An IAB node (e.g., MT part of the IAB node and/or DU part of the IAB node) or a WTRU (e.g., operating in a multi-hop IAB node) may receive configuration information from the network (e.g., a parent IAB node, a donor CU) regarding the reporting of a latency status report. The configuration information may specify the reporting periodicity or events/conditions (e.g., latency increase/decrease by a certain value/percentage, latency becoming larger than a certain value, etc.). The latency status report may include at least one of: the latency between the IAB node or WTRU and a first network node (e.g., a child node or WTRU); or the latency between the IAB node or WTRU and a second network node (e.g., a parent node). When it is time for reporting (e.g., a periodic reporting timer expires, reporting conditions/events were fulfilled, etc.), the IAB node or WTRU may send the latency report to the second network node (e.g., parent node or the donor CU). If receiving a report from a network node (e.g., the parent node or the child node) or another WTRU, the IAB node or WTRU may add to the received delay values one or more of the following, and, may forward the report to the second network node (e.g., next node), WTRU, or the donor CU: a processing delay at the IAB node or WTRU; or a latency of air interface between the IAB node or WTRU and the node that has sent the report or the node where the report is to be sent to.

IAB nodes or WTRUs may be enabled to make routing/scheduling decisions based on a packet's on flight time, an E2E delay budget, and/or an expected remaining latency. An IAB node (e.g., an MT part of the IAB node and/or DU part of the IAB node) or a WTRU (e.g., operating in a multi-hop IAB node) may receive a packet that includes information about the packet's on flight time. The IAB node or WTRU may receive information from network nodes (e.g., child/parent nodes) or the CU regarding the expected latency in the UL/DL for the packet to reach the CU/WTRU over the possible paths (e.g., different possible paths) available. Based on this information and the E2E PDB, the IAB node or WTRU may perform at least one of the following: drop the packet if the delay budget has elapsed (e.g., has already elapsed) or is expected to elapse before reaching the WTRU/CU; prioritize the scheduling of packets that have shorter remaining delay budgets; in the DL, if there are multiple paths available, schedule packets with shorter remaining delay budget over the path that has the lowest expected latency; or in the UL, in case multiple paths are available, try to get scheduled on (e.g., use) the path with the lowest expected UL latency for those packets that have shorter remaining delay budgets (e.g., and may send status reporting (SR)/buffer status reporting (BSR) related to those packets towards the parent on the lower latency path).

An IAB node (e.g., a MT part of the IAB node and/or a DU part of the IAB node) or a WTRU (e.g., a WTRU operating in a multi-hop IAB node) may receive configuration information indicating to connect with more than one parent node/cell (e.g., a first parent node via a first link and a second parent node via a second link) (e.g., dual connectivity). The IAB node or WTRU may transmit data to the first parent node via the first link and to the second parent node via the second link. The first link may be a default link and the second link may be a secondary link. The IAB node or WTRU may receive configuration information associated with a BH RLC channel (e.g., for an IAB node) or a bearer (e.g., for a WTRU). The IAB or WTRU may receive configuration information about the mapping of the BH RLC channels (e.g., for an IAB node) or the bearers (e.g., for a WTRU) with the link to one or both of the parent nodes (e.g., the first parent node via the first link and the second parent node via the second link). The configuration information may include (e.g., may include additional) information about different uplink buffer split thresholds (e.g., multiple buffer thresholds, such as a first buffer threshold and a second buffer threshold) and associated latency values (e.g., remaining PDB, packet on flight time, etc.). The UL split buffer thresholds (e.g., multiple buffer thresholds) may be dependent on a remaining PDB range of packets (e.g., the first buffer threshold may be associated with a remaining PDB range and the second buffer threshold may be associated with a second remaining PDB range). The IAB node or WTRU may receive an UL packet. The UL packet may include information about the packet's latency information (e.g., on flight time, remaining PBD, etc.); the WTRU may determine the information from the received packet. Based on the information, the IAB node or WTRU may select the corresponding uplink buffer split threshold (e.g., first buffer threshold or the second buffer threshold) based on the latency information (e.g., the determined remaining PDB) of the packet. If the current uplink buffer level associated with concerned bearer (e.g., for the WTRU) or BH RLC channel (e.g., for the IAB node) is equal to or above this threshold, the IAB node or WTRU may try to transmit the packet via the link (e.g., of the first link or the second link) that provides resources first An IAB node (e.g., a MT part of the IAB node and/or a DU part of the IAB node) or a WTRU (e.g., a WTRU operating in a multi-hop IAB node) may receive configuration information indicating to connect with more than one parent (e.g., a first parent node via a first link and a second parent node via a second link) (e.g., dual connectivity). The IAB node or WTRU may transmit data to the first parent node via the first link and to the second node parent node via the second link. The first link may be a default link and the second link may be a secondary link. The IAB node or WTRU may receive configuration information associated with a BH RLC channel (e.g., for an IAB node) or a bearer (e.g., for a WTRU). The IAB node or WTRU may receive confirmation information indicating the mapping of the BH RLC channels (e.g., for an IAB node) or the bearers (e.g., for a WTRU) with the link to one or both of the parent nodes (e.g., the first parent node via the first link and the second parent node via the second link). The configuration information may include (e.g., may include additional) information about latency thresholds (e.g., remaining PDB threshold, packet on flight time, etc.) for triggering UL packet duplication towards both parent nodes (e.g., the first parent node and the second parent node). The IAB node or WTRU may receive an UL packet. The UL packet may include and the WTRU may determine information about the packet's latency information (e.g., on flight time, remaining PDB, etc.). Based on this information, if the remaining PDB for the packet is below the specified threshold (e.g., the remaining PDB threshold), the IAB node or WTRU may duplicate the packet and send the data via both parents via both links (e.g., both to the first parent node via the first link and to the second parent node via the second link). The IAB node or WTRU may send (e.g., may also send) a scheduling request (SR) or buffer status report (BSR) to the first parent node if resources are not available on the first link and may send a SR or BSR to the second parent node if resources are not available on the second link.

An IAB node (e.g., a MT part of the IAB node and/or a DU part of the IAB node) or a WTRU (e.g., a WTRU operating in a multi-hop IAB node) may receive configuration information indicating to connect with more than one carrier with a given parent (e.g., a first parent node or a second parent node) (e.g., carrier aggregation). The IAB node or WTRU may receive configuration information about latency thresholds (e.g., remaining PDB, packet on flight time, etc.) for triggering UL packet duplication over both carriers. The IAB node or WTRU may receive an UL packet. The UL packet may include information about the packet's latency information (e.g., on flight time, remaining PDB, etc.). Based on this information, if the remaining PDB for the packet is below the specified threshold, the IAB node or WTRU may duplicate the packet and send the data via both carriers (e.g., via any unused grants on either carrier or send a SR/BSR towards the parent node and/or send the data when the resources become available on the concerned carriers, etc.).

Figure 2A:
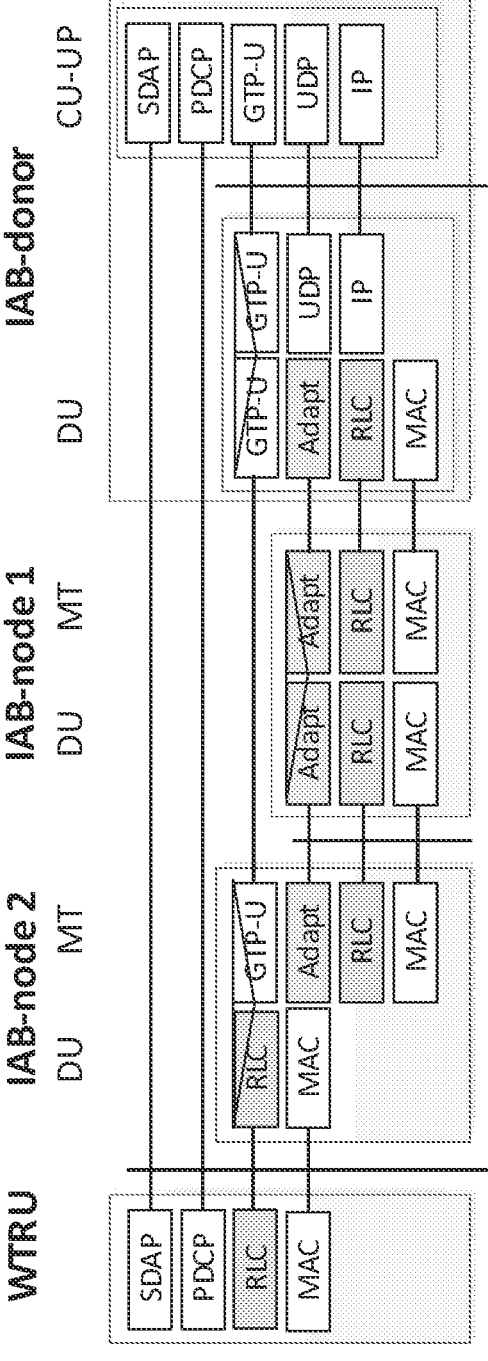
FIG. 2A illustrates an example of user plane (UP) protocol architecture.
Figure 2B:
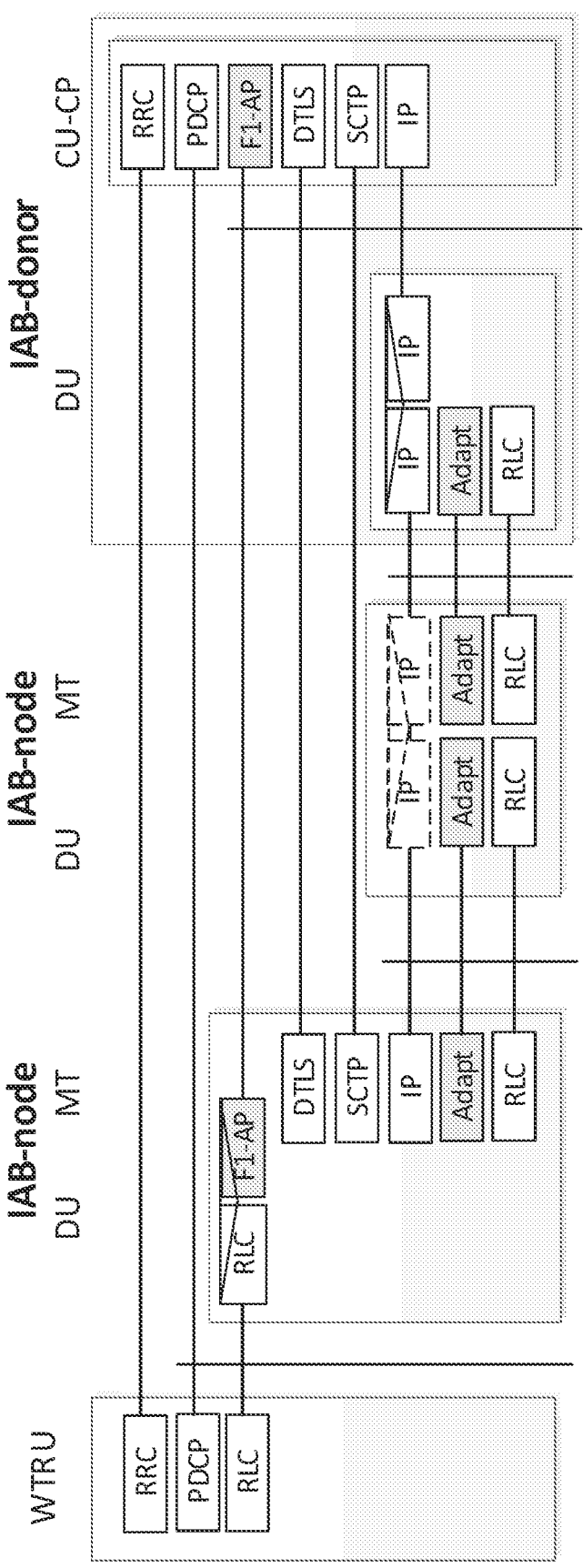
FIG. 2B illustrates an example of control plane (CP) protocol architecture.

FIG. 2A-B illustrates an example of user plane (UP) and control plane (CP) protocol architecture. An IAB, where part of the wireless spectrum is used for the backhaul connection of base stations instead of fiber, may allow for more flexible and cheaper deployment of dense networks as compared to deployments where there is a dedicated fiber link to the base stations. FIG. 2A illustrates an example of user plane (UP) protocol architecture. FIG. 2B illustrates an example of control plane (CP) protocol architecture.

The IAB node's protocol stack may include sides or parts (e.g., two sides), the MT part and the DU part. The MT part may be used to communicate with a network node (e.g., a parent node). The DU part may be used to communicate with a network node (e.g., a child node or a normal WTRU). Both the UP and CP architectures may employ a routing/forwarding approach inspired by IP networks. An IAB node (e.g., each IAB node) may be assigned an IP address. The IP address may be routable from a donor base station (and associated L2 addresses). Intermediate IAB nodes may forward the packets transparently based on route identifiers/destination addresses. The IAB node may terminate the DU functionality and a base station (e.g., referred to as IAB-donor) may terminate the CU functionality. The IAB node and donor CU (e.g., regardless of how many hops apart they are physically from each other) may form a logical base station unit employing CU/DU split architecture. The IAB node serving a WTRU may be referred to as the access IAB node while the nodes between the IAB donor DU and the access IAB node may be known as intermediate IAB nodes. In examples, an IAB node can play the role of both an access IAB node (e.g., for the WTRUs that are directly connected to it) and an intermediate IAB node (e.g., for WTRU(s) that are served by its descendant IAB nodes).

Hop-by-hop radio link control (H2H RLC) may be used between the IAB nodes. In examples, H2H RLC may be used instead of an E2E RLC between the donor DU and the WTRU. An adaption layer, which may be referred to as BAP, may be used to enable efficient multi-hop forwarding. The IAB-donor may assign a unique L2 address (e.g., BAP address) to each IAB node that it controls. In cases of multiple paths (e.g., links), multiple route IDs may be associated to each BAP address. The BAP of the origin node (e.g., IAB-donor DU for the DL traffic, and the access IAB node for the UL) may add a BAP header to packets they are transmitting. The transmitted packets may include a BAP routing ID (e.g., BAP address of the destination/source IAB node and the path ID). If a packet arrives that has a BAP routing ID that includes a BAP address that is equal to the IAB node's BAP address, the IAB node may know it will receive the packet and may pass the packet onto higher layers for processing (e.g., an F1-C/U message destined for the IAB node's DU, an F1-C message that includes SRB data for a WTRU directly connected to the IAB node, or an F1-U message that includes DRB data for a WTRU directly connected to the IAB node). The IAB node may employ routing/mapping tables to determine where to forward the data to. Each IAB node may have a routing table (e.g., configured by the IAB donor CU) including the next hop identifier for each BAP routing ID. Separate routing tables may be kept for the DL and UL direction. The DL table may be used by the DU part of the IAB node, while the MT part of the IAB node may use the UL table.

BH RLC channels may be used for transporting packets between IAB nodes (or between an IAB-donor DU and an IAB node). A BH RLC channel configuration may include the associated RLC and logical channel configuration. A many-to-one (N:1) or one-to-one (1:1) mapping may be performed between WTRU radio bearers and BH RLC channels. N:1 mapping may multiplex WTRU radio bearers (e.g., several WTRU radio bearers) into a BH RLC channel based on specific parameters, such as a QoS profile of the bearers. The N:1 mapping may be suitable for bearers that do not have requirements (e.g., very strict requirements), such as best effort bearers. The 1:1 mapping may map a WTRU radio bearer (e.g., each WTRU radio bearer) onto a separate BH RLC channel. The 1:1 mapping may be designed to ensure finer QoS granularity at a WTRU radio bearer level. The 1:1 mapping may be suitable for bearers with strict throughput or/and latency requirements, such as Guaranteed Bit Rate (GBR) bearers or VoIP bearers.

If an IAB node detects a BH radio link failure (RLF), the IAB node may send a BH RLF indication (which is a BAP control PDU) to its descendant nodes. If receiving such an indication from a network node (e.g., parent node), the IAB node may initiate procedures such as re-establishment to another parent. The IAB node may pause transmission/ reception with the concerned parent. The behavior on the reception of BH RLF indications may be left to IAB or network implementation.

In a multi-hop IAB network, data congestion may occur on an intermediate IAB node, which may lead to packet drops if left unresolved. Though higher layer protocols such as TCP may be used to assure reliability, TCP congestion avoidance and slow start mechanisms may be costly to overall E2E performance (e.g., throughput degradation). IAB networks may employ flow control. For the DL, both E2E and H2H flow control mechanisms may be available.

The DL E2E flow control may be based on the DL Data Delivery Status (DDDS) for CU/DU split architecture, e.g., in NR. In DDDS, the DU (e.g., in the context of IAB networks, the DU part of the access IAB node) may report to the CU (e.g., in the context of IAB networks, the donor CU, specifically, the CU-UP) information such as the desired buffer size per DRB, desired data rate per DRB, the highest successfully delivered PDCP SN, lost packets (e.g., not ACKed by the DU at RLC level), etc. In examples, access IAB nodes (e.g., only access IAB nodes) may perform DDDS (e.g., IABs report only information concerning the DRBs of the WTRUs that they are directly serving). No information may be provided regarding the BH RLC channels.

For DL H2H flow control, an IAB node may generate a flow control message (e.g., which may also be a BAP control PDU) if its buffer load exceeds a level or if it receives a flow control polling message from a peer BAP entity (e.g., a child node). The H2H flow control information may indicate the available buffer size. The H2H flow control information may be at the granularity of BH RLC channels (e.g., available buffer=value_1 for BH RLC channel #1, available buffer=value_2 or per BH RLC channel #2, etc.) and/or at the destination routing ID (e.g., available buffer=value_1 for destination routing ID=address1, available buffer=value2 for destination routing ID=address2, etc.). The node receiving the flow control message may use the information to control the traffic flow towards the sender (e.g., throttle or pause the traffic associated with a certain BH RLC channel and/or destination if the flow control message indicated a low available buffer for the concerned traffic, increase the traffic flow if the flow control was indicating a high available buffer value, etc.). In examples, the actions taken on flow control and the configurations/values of thresholds and other parameters to trigger flow control messages (e.g., buffer threshold values, polling timers, etc.) may not be specified.

In examples, pre-emptive buffer status reporting (BSR) may include an IAB node that triggers BSR to its parent node(s), e.g., even before data (e.g., new data) has arrived in its UL buffer, based on the BSR that it has received from its child nodes or WTRUs, or scheduling grants it has provided to them (e.g., an indication of anticipated data). An enhancement related to UL flow control may be provided. NR mechanisms may be applied where an IAB node controls the flow of UL data from its nodes (e.g., child nodes) and WTRUs by the providing its nodes (e.g., child nodes) and WTRUs with proper UL scheduling grants based on the BSR received from its nodes (e.g., child notes) and WTRUs. In examples, IAB nodes may be static nodes. Handover of IAB nodes (e.g., also referred to as migration or relocation) from one donor to another may be supported for load balancing and for (e.g., also for) handling radio link failures (RLFs) due to blockage (e.g., due to moving objects, such as vehicles, seasonal changes (foliage), or infrastructure changes (new buildings)). Infra-donor CU handover (e.g., only intra-donor CU handover) may be supported (e.g., the target and the source parent DUs of the IAB node may be controlled by the same donor CU). In examples, inter-donor CU handover may be specified.

Some examples may relate to NR and may (e.g., may also) support IAB connectivity via MR-DC (which may be used as an illustrative example herein) are provided herein. An IAB node may be connected to the network via EN-DC, where the master node may be an LTE node and the secondary node may be an NR node. The IAB node may be transparent (e.g., completely transparent) to WTRUs (e.g., from a WTRU's point of view, IAB nodes appear to be normal base stations).

When the DU of an IAB node schedules its WTRUs and the MTs of its IAB nodes (e.g., child IAB nodes), the DU of an IAB node may be aware of the conditions of the link(s) towards its child nodes and the link(s) towards its parent nodes. In the case of DL, the IAB node may properly estimate/calculate the latency for the packets to reach the child nodes. In the UL, the information about the link to a parent node may be useful for estimating the latency the packets may experience in the next hop, as the IAB node may have to get a grant from the parent node. The IAB node may have no information regarding the number of subsequent hops/nodes the packets may traverse before reaching their destination (e.g., nodes/hops upstream of the parent node in the UL and nodes/hops downstream of child nodes in the DL). The IAB node may have no information regarding the latency (e.g., total latency) the packets may experience in reaching their destination.

IAB nodes may have no information about the number of subsequent hops UL/DL the packets may traverse (e.g., except for the case of DL packets at an access IAB node), the radio conditions of these links, and the UL/DL data pending that may be sent on these links. Regarding pending UL data, the MT part of an IAB node may request UL resources via BSR and pre-emptive BSR (e.g., a BSR that is based on received BSR at the IAB node from child nodes/WTRUs, rather than a normal BSR that is based on actual pending UL data at the IAB MT). Pre-emptive BSR may not provide any information regarding when the reported data will arrive at the IAB node. Pre-emptive BSR may result in resource wastage as the parent node may schedule the IAB node before the data has actually become available at the MT. This may be prevented by delaying the scheduling due to pre-emptive BSR to some extent, but that may go against the rationale for pre-emptive BSR, which may be to ensure the reduction of the aggregate multi-hop latency of packets in the UL.

Scheduling based on pre-emptive BSR may have limitations as a network node (e.g., parent node) receiving the pre-emptive BSR may not necessarily know when the data will be ready for transmission at a network node (e.g., child node). Having 1:1 mapping on the hops (e.g., all the hops) for latency sensitive data may help to some extent. The more such bearers that are active, the less useful the 1:1 mapping may be, as the network may not ensure scheduling of packets on the hops (e.g., all such packets on all the hops all the time). BSR reporting may be limited to the number of LCGs. This may exacerbate the issue of performing fair scheduling decisions at a network node (e.g., the parent node) as the number of BH RLC channels to a network node (e.g., child node) may increase. A network node (e.g., parent node) may not know over (e.g., exactly over) which BH RLC channel data is pending.

A low number of LCGs for BSR reporting may limit the possibility to perform fair scheduling if there are several latency sensitive bearers that are mapped 1:1. Without knowing for how long packets have been on flight and how much more latency they may experience before reaching the target, there may be a risk of wasting resources for packets that have passed their delay budget (e.g., may be discarded at the application level).

In a multi-hop setting and a number (e.g., large number) of bearers (e.g., active bearers) that are delay sensitive, it is possible that considerable resources may be wasted on transmitting packets that have already passed their delay budget.

IAB work on multi-hop latency may include one or more of the following: that the IAB node may not help ensure that overall or remaining PDB is met for a packet (e.g., by prioritizing bearers with higher number of hops), as it may not have a latency reference for the packets being scheduled (e.g., this may result in packets with the same QoS requirement ending up with different latency); that the IAB node may need to report joint buffer status for LCHs which have differing QoS requirements (e.g., due to a limit on the number of LCGs); that buffer size calculation for preemptive BSR may differ for nodes of different vendors; that the CU may be unable to put bearers with lower PDB on routes with less congestion risk (e.g., higher resource efficiency) or which are RLF-free; or that the CU may be unable to configure routing based on actual (e.g., real-time) latency per BH RLC channel.

In examples, to make a decision (e.g., an ideal decision) at an intermediate IAB node regarding on how to schedule/prioritize packets so that PDBs are met, the IAB node may determine one or more of the following: how much is the end-to-end delay budget for the packet; how long the packet has been in flight; or how much extra delay the packet is going to experience on subsequent hops until the destination.

Some of the above information may not be readily accessible (e.g., how much extra delay the packet is going to experience on subsequent hops until the destination), or it may be expensive to provide (e.g., including information about how much is the end-to-end delay budget or how long the packet has been in flight in a packet's BAP header). Knowing the number of remaining hops may provide some information (e.g., implicit information) but may not be sufficient. In examples, due to congestion, a path with smaller number of hops may incur a shorter delay than that with a larger number of hops. One or more features described herein may provide ways to make information related to scheduling/prioritizing packets described herein become available at intermediate IAB nodes so that scheduling and routing decisions may be made to ensure PDBs of packets can be met.

Examples for enforcing PDBs in multi-hop IAB are provided herein. Examples herein may be for an IAB node in a multi-hop IAB network (e.g., the MT part of an IAB node or/and the DU part of an IAB node) and may be equally applicable to other kind of nodes or devices, such as a traditional wireless device (e.g., a WTRU), which may include a sidelink WTRU acting as a WTRU to WTRU relay or WTRU to NW relay (e.g., over sidelink). The terms IAB node, MT part of an IAB node or DU part of an IAB node, and WTRU may be used interchangeably.

A descendant (e.g., direct descendant) or a node (e.g., child node) of a IAB node may be an IAB node/WTRU that may be connected (e.g., directly connected) to the IAB node (e.g., a mobile terminal or node being served by the IAB node). In a multi-hop case, a given IAB node may be referred to as serving a node/WTRU indirectly if the UL/DL traffic of the WTRU/node has to traverse through the given IAB node before arriving at the WTRU/node (in the UL direction) or the donor node (in the DL direction). The term "descendant" may be used to refer to nodes/WTRUs that are directly or indirectly served by the IAB node.

Figure 3:
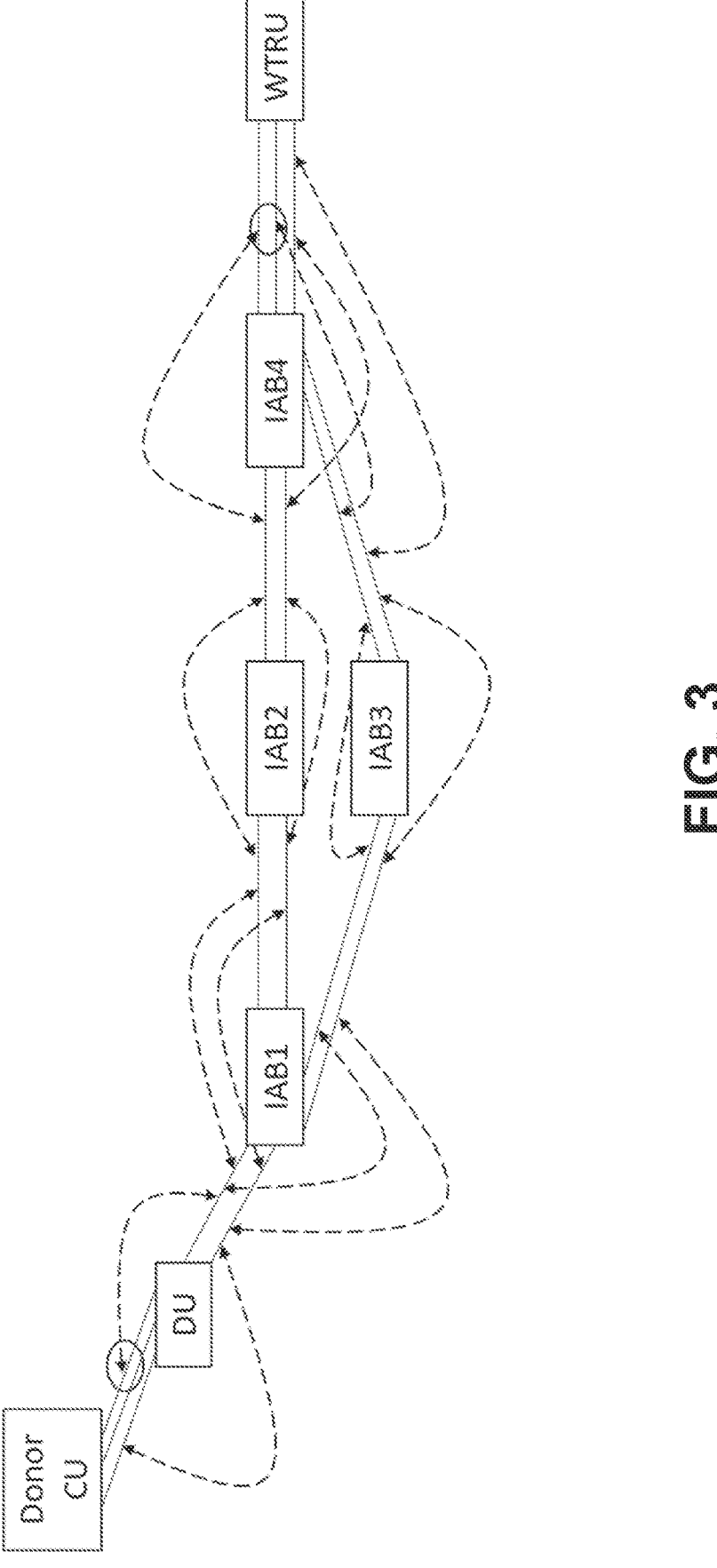
FIG. 3 illustrates an example of a WTRU associated with a number of bearers.

FIG. 3 illustrates an example of a WTRU with associated with a number of bearers. As shown in FIG. 3, a WTRU may have three bearers, where one of them may be mapped 1:1 on the backhaul channels (e.g., all the backhaul channels), while the other two may be mapped 2:1 on the backhaul channels. IAB1 may have two child nodes (IAB2 and IAB3) and may selectively route the DL packets towards one or the other. IAB4 may have two parents (IAB2 and IAB3) and may selectively route UL packets to one or the other. In examples, IAB1 and IAB4 may be configured to have one of the paths as a default path and use the other one as a backup in case of radio link failure. IAB1 and IAB4 may be configured by the network to independently decide on how to route the packets. The routing decision in the UL means that the IAB node may request scheduling on (e.g., only on) the chosen parent (e.g., or use the available grants, if already available).

With regard to DL packets, the term "delay experienced by a/the packet" at the donor DU or an IAB node may be used in examples herein to refer to the time that elapses from the arrival of the packet at the donor DU or the IAB node and the time the transmission of the packet was started on an egress link. With regard to UL packets, the term "delay experienced by a/the packet" at the IAB node may be used herein to refer to the time that elapses from the arrival of the packet at the IAB node and the time the transmission of the packet was started over an egress link. At a WTRU, the term may be used to refer to the time between the reception of the packet's reception, e.g., from higher/application layers at the WTRU's transmit buffers, until the time the transmission of the packet was started.

In the UL, a packet's on-flight time may refer to the time that has elapsed from the reception of the packet at the WTRU, e.g., reception from higher/application layer at the WTRU's transmit buffer. In the DL, a packet's on-flight time may refer to the time that has elapsed from the reception of the packet, e.g., from higher/application layer at the donor CU's transmit buffer. The terms delay and latency may be used interchangeably herein.

Examples related to making information about E2E delay budgets of packets becoming available at IAB nodes are provided herein. If backhaul RLC channels are configured between IAB nodes (e.g., two IAB nodes), the DU of the IAB node (e.g., parent IAB node) may be configured by the CU regarding the PDB for BH RLC channel over that hop.

IAB nodes (e.g., intermediate IAB nodes) may be provided the E2E PDB of a BH RLC channel, e.g., for a 1:1 mapped BH RLC channel. This information may be provided when the BH RLC channel is established or afterwards, e.g., via a BH RLC channel reconfiguration procedure. The IAB node may be configured with a mapping between the BH RLC channel ID or the LCID and E2E PDB (e.g., LCID x has an E2E PDB of 10 ms). The E2E PDB information regarding 1:1 mapped BH RLC channel may be:

a single value applicable to both UL and DL packets; separate values for UL and DL packets; or a range of values (e.g., PDB1=preferred value, PDB2=absolute maximum allowed).

IAB nodes (e.g., intermediate IAB nodes) may be provided the E2E PDB of a BH RLC channel, e.g., for an N:1 mapped BH RLC channel. This information may be provided when the BH RLC channel is established or afterwards, e.g., via a BH RLC channel reconfiguration procedure. The IAB node may be configured with a mapping between the BH RLC channel ID or the LCID and E2E PDB (e.g., LCID x has an E2E PDB of 10 ms). The E2E PDB information regarding N:1 mapped BH RLC channel may be: a range of values summarizing the E2E PDBs of bearers (e.g., all the bearers) multiplexed over that BH RLC channel (e.g., min PDB, max PDB, mean PDB); sets of values (e.g., one set of values) applicable to both UL and DL packets; or sets of values (e.g., two sets of values) for UL and DL packets.

In examples, such as in the reference scenario described herein, IAB1 may be configured with the hop-by-hop PDBs regarding the two BH RLC channels. IAB1 may be configured with the E2E PDB concerning the two BH RLC channels, that may include one or more of the information items discussed herein. The same may be applied for IAB nodes (e.g., all the IAB nodes) in the system.

Examples related to making information about a packet's departure time available are provided herein. An IAB node (e.g., access IAB node) may include the current timestamp on the BAP header of UL packets as it forwards them to the hop (e.g., first hop) upstream. The donor DU, on constructing a DL BAP packet to be sent on the hop (e.g., first hop) downstream, may include the current time stamp on the BAP header. IAB nodes (e.g., intermediate IAB nodes), when forwarding the data included with that BAP packet to the hop (e.g., next hop), may copy the timestamp that was included in the ingress BAP packet to the BAP header of the egress BAP packet.

The WTRU, when constructing a MAC PDU, may include the current timestamp, e.g., on the MAC PDU header. The IAB node (e.g., access IAB node), when forwarding the data over the first backhaul link in the upstream, may copy the timestamp, e.g., on the corresponding BAP header(s). The MAC PDU may include data belonging to different bearers, which may be mapped to different BH RLC channels. In examples, IAB4 (shown in FIG. 3) may receive a MAC PDU that may include data for the three bearers of the WTRU. That may result in the construction of three BAP packets, one including the data that is associated with a bearer (e.g., each bearer). Even though some bearers may be mapped to the same backhaul RLC channel, they may be transported within their own BAP packets, e.g., as there may be no multiplexing at the BAP level. The IAB node (e.g., access IAB node) may put the timestamp, e.g., that may have been included in the MAC PDU, on the three BAP packets that may have been generated from the data included in the MAC PDU. There may be a timestamp (e.g., one timestamp) for data included (e.g., all the data included) with the MAC PDU. The data from the different bearers that are included in the MAC PDU may have spent different amounts of time at the WTRU's transmit buffers before they were multiplexed at the MAC and sent out.

There may be more than one timestamp in the MAC PDU that accounts for the different delay the packets that correspond to different bearers multiplexed within the MAC PDU have experienced at the WTRU (e.g., a time stamp signifying the time at the reception of the packet from upper layers).

This may be done in several ways/formats. In examples, a timestamp may be included for each LCID/bearer (e.g., in a bitmap). A timestamp and a delta value for one of the LCID/bearers compared to the other bearers may be included. The delta value may be a time value (e.g., milliseconds) or may signify a range of values (e.g., value 0 corresponding to the same time, 1 signifying 0-1 ms, 2 signifying 1-2 ms, etc.). A timestamp for a group of LCID/bearers (e.g., one timestamp for LCID 1,2, another timestamp for LCID 3) may be included. In examples, IAB4 (shown in FIG. 3) may receive a MAC PDU. The MAC PDU may include data for bearers (e.g., for the three bearers) of the WTRU and three timestamps, where each respective timestamp corresponds to each respective bearer/LCID. The IAB node (e.g., access IAB node) may put the corresponding timestamp that was included in the MAC PDU on the BAP packets (e.g., the three BAP packets) generated from the data included in the MAC PDU.

The WTRU may (e.g., instead of including the timestamp or timestamps) include the delay experienced by the packets multiplexed within the MAC PDU. This may help reduce the size of MAC header. There may be different ways/formats of including this information. In examples, a delay value corresponding to bearers (e.g., all the bearers) multiplexed within the MAC PDU may be included. The delay value may correspond to at least one of: the maximum delay, indicating that at least one packet that belongs to one of the multiplexed bearers within this MAC PDU has experienced the indicated buffering delay at the WTRU; the minimum delay, indicating that packets (e.g., all packets) that belong to one of the multiplexed bearers within this MAC PDU has experienced at least the indicated buffering delay at the WTRU; or the average buffering time for the data included in the MAC PDU. In examples, a delay value for each LCID/bearer (e.g., in a bitmap) may be included. In examples, a delay value and a delta value for one of the LCID/bearers compared to the other bearers may be included. The delta value may be an exact time value (e.g., milliseconds) or signify a range of values (e.g., value 0 corresponding to the same time, 1 signifying 0-1 ms, 2 signifying 1-2 ms, etc.). In examples, a delay value for a group of LCID/bearers (e.g., one delay value for LCID 1,2, another delay value for LCID 3) may be included.

In examples, IAB4 (shown in FIG. 3) may receive a MAC PDU that includes data for bearers (e.g., the three bearers of the WTRU and three delay values corresponding to each bearer/LCID). The IAB node (e.g., access IAB node) may calculate the timestamp to put on the packets (e.g., three BAP packets) that the IAB node is generating corresponding to this MAC PDU by subtracting the corresponding delay values from the current time (e.g., if current time is, in HH:MM:SS:mm format 10:10:10:10, and the three delay values were 1,2 and 3 ms, the corresponding timestamp values will be 10:10:10:09, 10:10:10:08 and 10:10:10:07).

The IAB node (e.g., access IAB node) may account for the latency over the access link. In examples, IAB4 may receive a MAC PDU that includes data for bearers (e.g., data for the three bearers of the WTRU and three delay values corresponding to each bearer/LCID). The IAB node (e.g., access IAB node) may calculate the timestamp to put on the BAP packets (e.g., three BAP packets) that the IAB node is generating corresponding to this MAC PDU by subtracting the latency over the access link and the corresponding delay values from the current time.

IAB4 may receive a MAC PDU that includes data (e.g., data for the three bearers of the WTRU and three delay values corresponding to each bearer/LCID). The IAB node (e.g., access IAB node) may calculate the timestamp to put on the BAP packets (e.g., three BAP packets) that the IAB node is generating corresponding to this MAC PDU by subtracting the corresponding delay values and the access link latency from the current time (e.g., if current time is, in HH:MM:SS:mm format 10:10:10:10, and the three delay values were 1,2 and 3 ms, and the latency is 1 ms, the corresponding timestamp values will be 10:10:10:08, 10:10:10:07 and 10:10:10:06).

Similar examples as above may be applied between the donor CU and donor DU. For example, the donor CU may include the delay/timestamps, etc., on the MAC PDU that it is sending towards the donor DU. The donor DU may include a timestamp based on that, the current time, and the latency between the donor DU and CU. The latency on the link between the donor DU and CU may be negligible (e.g., especially if they are co-located).

Examples related to making information about a packet's on-flight time available at IAB nodes are provided herein. Examples herein may be focused on making the departure time (e.g., timestamp) of the packet available. This may allow the IAB nodes (e.g., intermediate IAB nodes) having that information (e.g., as well as the information about the E2E PDB) to may make more informed scheduling and routing decisions. Including the timestamp on BAP hearers (e.g., each BAP header) (and also the MAC PDU sent between the WTRU and access IAB node in the UL direction) may be expensive from required radio resources point of view (e.g., especially if there are bearers with very small packet size). An IAB node may put the delay information experienced so far by the packet on the BAP header before forwarding it over the egress link. Details on how this is determined in UL and DL directions are described herein.

In the UL, the IAB node (e.g., the access IAB node) may receive the delay incurred by the packet at the WTRU by information included in the MAC PDU that carried the data associated with the packet as per example(s) described herein. The IAB node (e.g., access IAB node) may add to this delay value the latency over the access link. The IAB node (e.g., access IAB node) may include this delay information over the BAP header for that packet.

If sending a MAC PDU towards a network node (e.g., parent node) over a BH link, the IAB node (e.g., access IAB node) may include information (e.g., additional information) over the MAC PDU corresponding to the delay the BAP packet has experienced on the UL before it was transmitted. Since a MAC PDU may include more than one BAP packet multiplexed within it, the delay information within the MAC PDU may include information corresponding to a BAP packet (e.g., each BAP packet). In examples, a delay value corresponding to BAP packets (e.g., all the BAP packets) multiplexed within the MAC PDU may be associated with at least one of: the maximum delay, indicating that at least one of the BAP packets that may be multiplexed within this MAC PDU have experienced the indicated buffering delay at the IAB node (e.g., access IAB node); the minimum delay, indicating that BAP packets (e.g., all the BAP packets) that may be multiplexed within this MAC PDU have experienced at least the indicated buffering delay at the IAB node (e.g., access IAB node); or the average buffering time for the BAP packets included in the MAC PDU. In examples, a delay value for each BAP packet/LCID (e.g., in a bitmap) may be included. In examples, a delay value and a delta value for one of the BAP packet/LCID compared to the other BAP packets may be included. The delta value may be an exact time value (e.g., milliseconds) or signify a range of values (e.g., value 0 corresponding to the same time, 1 signifying 0-1 ms, 2 signifying 1-2 ms, etc.). In examples, a delay value for a group of BAP packets/LCIDs (e.g., one delay value for LCID 1,2, another delay value for LCID 3) may be included.

If a network node (e.g., intermediate IAB node) or the donor DU receives the MAC PDU that includes delay information at the MAC PDU level and at the BAP header level, it may calculate the overall delay for the BAP packet as the sum of: the delay value indicated at the BAP header; the delay value indicated at the MAC header; and the latency over the backhaul link between a network node (e.g., intermediate IAB node) and a different network node (e.g., the child IAB node) that sent the concerned MAC PDU. If the data gets forwarded (e.g., forwarded further) to a different node (e.g., parent node), a network node (e.g., the intermediate IAB node) may include the delay calculated as above, e.g., using any of the examples discussed herein.

In the DL, the donor DU may receive the delay incurred by the packet at the donor CU by information included in the MAC PDU that carried the data corresponding to the packet (e.g., as per examples described herein). The donor DU may add to this delay value the latency over the link between the donor CU and DU, if any. The donor DU may include this delay information over the BAP header for that packet. If sending a MAC PDU towards a network node (e.g., child node) over a BH link, the donor DU may include information (e.g., additional information) over the MAC PDU associated with the delay the BAP packet has experienced on the DL packet before it was transmitted. Since a MAC PDU may include more than one BAP packet multiplexed within it, the delay information within the MAC PDU may include information associated with a BAP packet (e.g., each BAP packet). In examples, a delay value corresponding to BAP packets (e.g., all the BAP packets) multiplexed within the MAC PDU may be associated with at least one of: the maximum delay, indicating that at least one of the BAP packets that may be multiplexed within this MAC PDU has experienced the indicated buffering delay at the donor DU; the minimum delay, indicating that the BAP packets (e.g., all the BAP packets) that may be multiplexed within this MAC PDU have experienced at least the indicated buffering delay at the donor DU; or the average buffering time for the BAP packets included in the MAC PDU. In examples, a delay value for each BAP packet/LCID (e.g., in a bitmap) may be included. In examples, a delay value and a delta value for one of the BAP packet/LCID compared to the other BAP packets may be included. The delta value may be an exact time value (e.g., milliseconds) or signifies a range of values (e.g., value 0 corresponding to the same time, 1 signifying 0-1 ms, 2 signifying 1-2 ms, etc.). In examples, a delay value for a group of BAP packets/LCIDs (e.g., one delay value for LCID 1,2, another delay value for LCID 3) may be included.

If a network node (e.g., an intermediate IAB node or access IAB node) receives the MAC PDU that includes delay information at the MAC PDU level and at the BAP header level, it may calculate the overall delay for the BAP packet so far as the sum of: the delay value indicated at the BAP header; the delay value indicated at the MAC header; and the latency over the backhaul link between the intermediate IAB node and the parent IAB node that sent the concerned MAC PDU. If the data gets forwarded (e.g., forwarded further) to a different network node (e.g., child node), the network node (e.g., intermediate IAB node) may include the delay calculated as above, e.g., using any of the examples discussed herein.

The IAB node may add the latency over the previous link on the delay information. In the UL, a IAB node (e.g., access IAB node) may include the delay over the link between the WTRU and itself. A different network node (e.g., the next IAB node) may include the delay between itself and a network node (e.g., access IAB node) and so on. In the DL, a first IAB node on the DL may include the delay between itself and the donor DU. A different network node (e.g., the child of this IAB node) may include the delay between itself and the first IAB node in the DL, and so on.

Delay values described herein may include one or more items. In examples, the delay values may include a radio frame/slot/transmit time interval (TTI) used to transmit the concerned MAC PDU (assuming no retransmissions). This may have a fixed value. The delay values may include a processing time at the transmitting and receiving units (e.g., adding packet headers, stripping packet headers, performing checksums, other processing at different layers such as PHY, MAC, RLC, until the packet is received at the BAP layer, etc.). This may have a fixed value. The delay values may include retransmissions (e.g., additional retransmissions) if required (e.g., at MAC/RLC level). This may be a variable value that may depends on certain conditions (e.g., instantaneous radio conditions).

In the DL, a receiving IAB node or WTRU may track information associated with MAC/RLC level retransmissions (e.g., the number HARQ NACKs sent to the parent corresponding to the given MAC PDU, the number of RLC NACKs sent to the parent corresponding to the given MAC PDU, etc.). The receiving IAB node or WTRU may calculate the latency (e.g., total latency) over the previous link using the information associated with the MAC/RLC level retransmissions by including one or more of the following: one more frame/slot duration for each NACK; one more TTI for each NACK; one more PHY layer round trip time (RTT) for each NACK; or a pre-configured time duration for each NACK (e.g., a certain number of ms, radio frame/slot duration, etc.).

In the UL, a receiving IAB node or donor DU may track information associated with MAC/RLC level retransmissions (e.g., the number HARQ NACKs sent to the child node corresponding to the given MAC PDU, the number of RLC NACKs sent to the child corresponding to the given MAC PDU, etc.). The receiving IAB node or donor DU may calculate the total latency over the previous link using the information associated with the MAC/RLC level transmissions by including one or more of the following: one more frame/slot duration for each NACK; one more TTI for each NACK; one more PHY layer RTT for each NACK; or a pre-configured time duration for each NACK (e.g., a certain number of ms, radio frame/slot duration, etc.).

Information about a packet's remaining PDB may be made available at IAB nodes. The departure time (e.g., timestamp) of the packet or the latency the packet has already experienced may be made available to the IAB nodes (e.g., as described herein).

An IAB node or a donor DU may include information related to the remaining delay budget of the packet in the packet (e.g., in the BAP header before forwarding it over the egress link). This may be determined in the UL and DL directions as explained herein.

One or more of the following may apply (e.g., for UL direction). An access IAB node may be configured with the information regarding the E2E delay budget of bearer(s) (e.g., each bearer). The access IAB node may receive information (e.g., or may make an estimation) about the delay incurred by the packet at the WTRU (e.g., by information included in the MAC PDU that carried the data corresponding to the packet, as described herein). The access IAB node may subtract this delay value from the E2E delay budget for the bearer that the packet belongs to. The access IAB node may include this delay information, e.g., on the BAP header for the packet.

If sending a MAC PDU towards a network node (e.g., parent node) over a BH link, the access IAB node may include information (e.g., additional information) over the MAC PDU corresponding to the delay the BAP packet has experienced on the UL before it was transmitted. Since a MAC PDU may include more than one BAP packet multiplexed within it, the delay information within the MAC PDU may include one or more of the following information associated with BAP packet(s) (e.g., each BAP packet): a delay value corresponding to the BAP packets (e.g., all the BAP packets) multiplexed within the MAC PDU, corresponding to one of: (i) the maximum delay (e.g., indicating that at least one of the BAP packets that is multiplexed within this MAC PDU has experienced the indicated buffering delay at the access IAB node); the (ii) minimum delay (e.g., indicating that the BAP packets (e.g., all the BAP packets) that are multiplexed within this MAC PDU have experienced at least the indicated buffering delay at the access IAB node); or (iii) the average buffering time for the BAP packets included in the MAC PDU; a delay value for BAP packet(s)/LCID(s) (e.g., each BAP packet/LCID (e.g., in a bitmap)); a delay value and a delta value for one of the BAP packet(s)/LCID(s compared to the BAP packet/LCID for the other BAP packets (e.g., the delta value may be a time value (e.g., milliseconds) or may signify a range of values (e.g., value 0 corresponding to the same time, 1 signifying 0-1 ms, 2 signifying 1-2 ms, etc.)); or a delay value for a group of BAP packets/LCIDs (e.g., one delay value for LCID 1,2, another delay value for LCID 3).

In the UL direction, if an intermediate IAB node (e.g., or the donor DU) receives the MAC PDU that includes the delay information at the MAC PDU level and the remaining PDB at the BAP header level, the intermediate IAB node (e.g., or the donor DU) may update the remaining PDB by subtracting the following from the remaining PDB: a delay value for the BAP packet indicated at the MAC header; and a latency over the backhaul link between a node (e.g., the intermediate IAB node) and another node (e.g., the child IAB node) that sent the concerned MAC PDU. Determining the information related to the remaining PDB of the packet in the UL direction may be continued until the packet reaches the donor.

One or more of the following may apply (e.g., for DL). A donor DU may be configured with the information regarding the E2E delay budget of bearer(s) (e.g., each bearer). The donor DU may receive the delay incurred by the packet at the donor CU (e.g., by information included in the MAC PDU that carried the data corresponding to the packet, as described herein). The donor DU may add to this delay value the latency over the link between the donor CU and DU, if any. The donor DU may subtract this delay value from the E2E PDB of the packet. The donor DU may include this delay information on the BAP header for that packet.

If sending a MAC PDU towards a node (e.g., a child node) over a BH link, the donor DU may include information (e.g., additional information) over the MAC PDU corresponding to the delay the BAP packet has experienced on the DL before it was transmitted. Since a MAC PDU may include more than one BAP packet multiplexed within it, the delay information within the MAC PDU may include at least the following information associated with BAP packet(s) (e.g., each BAP) packet: a delay value corresponding to the BAP packets (e.g., all the BAP packets) multiplexed within the MAC PDU, corresponding to one of: (i) the maximum delay (e.g., indicating that at least one of the BAP packets that is multiplexed within this MAC PDU has experienced the indicated buffering delay at the donor DU); (ii) the minimum delay (e.g., indicating that the BAP packets (e.g., all the BAP packets) that are multiplexed within this MAC PDU have experienced at least the indicated buffering delay at the donor DU); (iii) or the average buffering time for the BAP packets included in the MAC PDU; a delay value for BAP packet(s)/LCID(s) (e.g., each BAP packet/LCID (e.g., in a bitmap)); a delay value and a delta value for one of the BAP packet(s)/LCID(s) compared to the other BAP packets (e.g., the delta value may be a time value (e.g., milliseconds) or may signify a range of values (e.g., value 0 corresponding to the same time, 1 signifying 0-1 ms, 2 signifying 1-2 ms, etc.)); or a delay value for a group of BAP packets/LCIDs (e.g., one delay value for LCID 1,2, another delay value for LCID 3).

In the DL direction, if an intermediate IAB node (e.g., or access IAB node) receives the MAC PDU that includes delay information at the MAC PDU level and the remaining PDB at the BAP header level, the intermediate IAB node (e.g., or access IAB node) may update the remaining PDB by subtracting the following from the remaining PDB: a delay value for the BAP packet indicated at the MAC header; and a latency over the backhaul link between a node (e.g., intermediate IAB node) and another node (e.g., the parent IAB node) that sent the concerned MAC PDU. Determining the information related to the remaining PDB of the packet in the DL direction may be continued until the packet reaches the access IAB node or the WTRU.

The IAB node may subtract the latency over the previous link on the remaining packet delay information (e.g., in the above implementations). In the UL, an access IAB node may consider the delay over the link between the WTRU and itself. The next IAB node may consider the delay between itself and the access IAB node and so on. In the DL, an IAB node (e.g., a first IAB node) on the DL may consider the delay between itself and the donor DU. The child of this IAB node (e.g., a second IAB node) may consider the delay between itself and the first IAB node in the DL, and so on. The delay values may include at least the following: a radio frame/slot/TTI used to transmit the concerned MAC PDU (e.g., assuming no retransmissions, this may be assumed to have a fixed value); a processing time at the transmitting and receiving units (e.g., adding packet headers, stripping packet headers, performing checksums, other processing at different layers such as PHY, MAC, RLC, until the packet is received at the BAP layer, etc., this may (e.g., may also) be assumed to have a fixed value); or additional retransmissions if required (e.g., at MAC/RLC level, this is a variable value that may depend on certain conditions (e.g., instantaneous radio conditions)).

A receiving IAB node or WTRU may track information associated with MAC/RLC level retransmissions (e.g., the number HARQ NACKs sent to the parent corresponding to the given MAC PDU, the number of RLC NACKs sent to the parent corresponding to the given MAC PDU, etc.). The receiving IAB node or WTRU may calculate the total latency over the previous link using the information associated with the MAC/RLC level retransmissions by including one or more of the following: 1 more frame/slot duration for NACK(s) (e.g., each NACK); 1 more TTI for NACK(s) (e.g., each NACK); 1 more PHY layer RTT for NACK(s) (e.g., each NACK); or a pre-configured time duration for NACK(s) (e.g., each NACK) (e.g., a certain number of ms, radio frame/slot duration, etc.).

A receiving IAB node or donor DU may track information associated with MAC/RLC level retransmissions (e.g., the number HARQ NACKs sent to the child node corresponding to the given MAC PDU, the number of RLC NACKs sent to the child corresponding to the given MAC PDU, etc.). The receiving IAB node or WTRU may calculate the total latency over the previous link using the information associated with MAC/RLC level retransmissions by including one or more of the following: 1 more frame/slot duration for NACK(s) (e.g., each NACK); 1 more TTI for NACKs (e.g., each NACK); 1 more PHY layer RTT for NACKs (e.g., each NACK); or a pre-configured time duration for NACKs (e.g., each NACK) (e.g., a certain number of ms, radio frame/slot duration, etc.).

Examples for determining the expected latency over the remaining hops are provided herein. Examples described herein may enable the IAB nodes to determine the E2E delay budget of a packet (e.g., each packet or average/max/min values in case of N:1 mapping), as well as the delay (e.g., total delay) experienced by the packet so far (either directly by having an accumulated delay value included in the BAP headers or indirectly via at timestamp that is included in the BAP header). To make scheduling (e.g., optimal scheduling) or routing decisions, the IAB node may be enabled to determine the expected latency for the packet on the remaining path.

A WTRU or an IAB node may be configured to report latency related information (e.g., which may be referred to as latency status report) to the IAB node that is serving it. This may be done in a regular fashion (e.g., every 100 ms) or based on some event, such as if at least one of the following occur: the delay increases/decreases by a certain absolute amount; the delay increases/decreases by a certain percentage value; the delay becomes larger than a certain threshold; or the delay becomes smaller than a certain threshold.

The WTRU or IAB node may (e.g., may also) be configured with parameters (e.g., additional parameters) related to latency status reports such as the filtering/averaging duration/window and time to trigger (TTT) for the event triggered reports.

The WTRU or IAB node may be configured with a parameter associated with a reporting duration/window. The report duration/window may specify the duration during which the reported measurements are collected/summarized. For periodical reporting, the report may be configured to be triggered every 100 ms. The report may include the summary of the delay history in the last 50 ms. By default, the reporting triggering time interval may be considered to be the same as the reporting duration/window. For an event triggered, the report may be configured to be triggered when the latency is above 5 ms. The report may include the summary of the delay history in the last 50 ms.

The latency reporting configuration may be on a per BH link level (e.g., the latency experienced by packets that belong to any of the RLC channel on that link). The latency reporting configuration may be on a per RLC channel level. Different reporting configurations (e.g., reporting periodicity, events/conditions, TTT, filtering window, etc.) may be provided for different LCIDs. In examples, the latency status report may include information at BH link level. The latency status report may include information at BH RLC channel level (e.g., per LCID). The latency status report may include at least one of the following: from a node to child nodes (e.g., regarding delay in the UL), the UL delay experienced on the hop between the reporting IAB node and its parent node(s); or from a node to parent nodes (e.g., regarding delay in the DL), the DL delay experienced on the hop between the reporting IAB node and its child node(s) or WTRU (e.g., if the reporting node is an access node).

In examples (e.g., as shown FIG. 3), IAB1 may send the UL delay on the hop between itself and the donor DU towards its children IAB2 and IAB3. IAB2 may send the UL delay on the hop between itself and IAB1 to IAB4. IAB3 may (e.g., may also) send the UL delay between itself and IAB1 to IAB4. IAB4 may send the DL delay on the hop between itself and the WTRU towards IAB2 and IAB3. IAB3 may send the DL delay on the hop between itself and IAB4 towards IAB1. IAB2 may send the DL delay on the hop between itself and IAB4 towards IAB1. IAB1 may send the DL delay on the hop between itself and IAB2 to the donor DU (e.g., as well as the delay on the hop between itself and IAB3 to the donor DU).

The latency status report may include at least one of the following: from a node to child nodes (e.g., regarding delay in the UL), the aggregate UL delay experienced between the reporting IAB node and donor DU/CU; or from a node to parent nodes (e.g., regarding delay in the DL), the aggregate DL delay experienced between the reporting IAB node and the WTRU. To determine the UL aggregate delay values, IAB nodes may pass the one hop delay reports they get from their parents to their child nodes or parent nodes. The IAB nodes may add the delay on the hop between the IAB node and the parent or child.

In examples (as shown in FIG. 3), IAB1 may send the UL delay on the hop between itself and the donor DU towards its children IAB2 and IAB3. IAB2 may add to that delay, the UL delay between itself and IAB1 and may send it to IAB4. A similar procedure may be followed on the other path (IAB1-IAB3-IAB4). In the other direction, IAB4 may send to IAB2 the combined DL delay of the hop between itself and the WTRU, as well as the hop between itself and IAB2, and so on.

The latency status report may include at least one of the following: from a node to child nodes (e.g., regarding delay in the UL), the UL delay experienced on the hop between the reporting IAB node and the child node; or from a node to parent nodes (e.g., regarding delay in the DL), the DL delay experienced on the hop between the reporting IAB node and the parent node.

In examples (e.g., as shown in FIG. 3), the donor DU may send to IAB1 the UL delay on the hop between itself and IAB1, IAB2. IAB1 may send to IAB2/3 the UL delay on the hop between itself and IAB2/3. IAB2/3 may send to IAB4 the UL delay on the hop between themselves and IAB4. In the other direction, IAB4 may send to IAB2/3 the DL delay on the hop between itself and IAB2/3. IAB2/3 may send to IAB1 the DL delay on the hop between themselves and IAB1. IAB1 may send to donor DU the DL delay between itself and the donor DU.

The latency status report may include at least one of the following: from a node to child nodes (e.g., regarding delay in the UL), the aggregate UL delay experienced between the receiving node and donor DU/CU; or from a node to parent nodes (e.g., regarding delay in the DL), the aggregate DL delay experienced between the receiving node and the WTRU.

In examples (e.g., as shown in FIG. 3), IAB1 may add the UL delay between itself and IAB2 on top of the UL delay it has received from the donor DU and may send it to IAB2. IAB2 may add on that the UL delay between itself and IAB4 on top of the UL delay it has received from IAB1 and may send it to IAB4. A similar procedure may be followed on the other path (IAB1-IAB3-IAB4). In the other direction, IAB2 may add the DL delay between itself and IAB1 on the DL delay value it has received from IAB4 and may send it to IAB1. The IAB2 may (e.g., may then) add the delay between the IAB1 and the donor DU and pass it on to the donor DU.

Each IAB node may be dynamically updated on the remaining delay packets (e.g., remining total delay) packets are expected to experience on the UL/DL. Combined with the examples described herein, the IAB node may be enabled to know about the E2E PDB (e.g., for the 1:1 mapped bearers and average/min/max values for the N:1 mapped bearers). Combined with the delay that the packets have already experienced, an IAB node may make a more informed scheduling and/or routing decisions. The IAB node may prioritize the scheduling of packets that have short remaining delay budget. The IAB node may, if there are multiple paths available, schedule packets with short remaining delay budget over the path that has the lowest expected latency. In the UL direction, if there are multiple paths available, the IAB node may try to get scheduled on the path with the lowest expected UL latency (e.g., send SR/BSR related to those packets towards the parent on the lower latency path). The IAB node may, if packets arrive and their delay budget has already passed (e.g., they have been on flight for longer than the E2E delay budget), drop the packets. The IAB node may perform a proactive drop if the delay budget has not elapsed, but the expected latency on the path with the lowest delay is higher than the remaining delay budget for the packet. Since the expected latency may be not 100% accurate, it may be undesirable to drop packets proactively that way. To use some safety margin, packets may be dropped if the remaining delay budget is lower than the expected latency on the path of lowest delay by a certain amount or percentage. For example, if the remaining delay budget for a packet is 10 ms, the packet may not be dropped if the expected latency on the remaining path is not larger 12 ms (e.g., if a 20% safety margin is applied).

The IAB nodes may report (e.g., report directly) to the donor CU (e.g., via RRC signaling, F1 signaling, etc.) the per hop delays or remaining path delays. Different reporting periods, conditions, and other parameters may be configured (e.g., similar to the hop to hop latency status reports).

The CU may provide the IAB nodes with the reporting configuration for (e.g., for both) the hop by hop reporting and reporting to the CU. The CU may provide the IAB nodes with the reporting configuration for the reporting to the CU, while the reporting configuration for the hop by hop reporting may be configured by a network node (e.g., a parent or child node). This information may be used by the CU to make longer term topology adaptation decisions routing tables of the IAB nodes, if some hops or paths are identified to be leading to consistently higher latencies. The CU may trigger IAB node relocation from one network node to another (e.g., parent node to another), change routing tables/path for certain WTRUs or bearers, change the mapping from 1:1 to N:1 or vice versa to load balance among the different paths, etc. Hop by hop latency reporting may be considered to be an inner-loop toolbox for faster latency control/enforcement. The E2E reporting towards the donor CU may be considered as an input for an outer-loop control mechanism for making less frequent but more consequential latency control/enforcement decisions.

The hop by hop report may be sent via a MAC CE. The hop by hop report may be sent via a BAP control PDU. The information provided to the IAB nodes may be the on-flight time. The information may be the remaining delay budget for the packet (e.g., which may be the E2E PDB—the on-flight time).

Examples related to delayed construction of BAP headers are provided herein. The BAP packets may be constructed before the MAC PDU that transports the BAP packets is actually scheduled over the air interface. Delay information about the BAP packets at the MAC PDU level may be provided (e.g., the delay between the construction of the BAP packet and the sending of the MAC PDU including the BAP packet).

The BAP PDUs may be constructed (e.g., or their headers updated) when it is time to send data in the UL or DL and prepare the MAC PDU.

If the elapsed flight time of the packet is included in the BAP header when the BAP packet is received on the ingress link, the IAB node may calculate the elapsed flight time at that time. The IAB may (e.g., may also) save information on when this BAP header is constructed, but may refrain from sending the BAP packet down to the RLC layer. When the packet is to be sent over the egress link (e.g., UL grant provided, IAB DU decides to schedule the packet, etc.), the MAC may pull the data from the RLC/BAP. The BAP header may be updated (e.g., the additional time between the first construction of the BAP packet and the elapsed time until now may be added to the elapsed flight time of the packet in the BAP header), and (e.g., and then) the packet may be pushed to RLC and MAC. That way, there may be no need to include delay information at the MAC PDU level.

If the remaining PDB of the packet is included in the BAP header when the BAP packet is received on the ingress link, the IAB node may calculate the remaining PDB. The IAB node may (e.g., may also) save information on when this BAP header is constructed, but may refrain from sending the BAP packet down to the RLC layer. When the packet is to be sent over the egress link (e.g., UL grant provided, IAB DU decides to schedule the packet, etc.), the MAC may pull the data from the RLC/BAP. The BAP header may be updated (e.g., the additional time between the first construction of the BAP packet and the elapsed time until now may be subtracted from the remaining PDB of the packet in the BAP header), and (e.g., and then) the packet may be pushed to RLC and MAC. That way, there may be no need to include delay information at the MAC PDU level.

Examples related to split buffer threshold adaptation (e.g., multiple buffer threshold adaptation, such as a first buffer threshold and a second buffer threshold) based on remaining PDB and/or remaining expected latency are provided herein.

A WTRU or an IAB node that has multiple parents (e.g., a first parent node and a second parent node) may be configured to adapt the UL split buffer (e.g., multiple buffer threshold) operation. The UL split buffer (e.g., multiple buffer) operation may be dependent on the remaining PDB and/or the remaining expected latency on the path(s) to the donor. This may allow a dynamic adaptation/load-balancing between the paths (e.g., two links, such as a first link associated with a first parent node and a second link associated with the second parent node), which may depend on the UL buffer level and may (e.g., may also) depend on the needs of that particular packet (e.g., how much PDB that packet has left). In examples, the WTRU may attempt to transmit a certain packet via either the first parent node or the second part node (e.g., on the link (e.g., the first link associated with the first parent node or the second link associated with the second parent node) that may provide the required resource grants first), even if the buffer threshold level is not high but the concerned packet has a short (e.g., below a threshold) remaining delay budget. This may increase/maximize the possibility that the packet will arrive at the destination before the delay budget expires.

FIG. 4 illustrates an example of a split buffer thresholds (e.g., multiple buffer thresholds) that are associated with a remaining PDB. A WTRU (e.g., a WTRU operating in a multi-hop IAB node) or an IAB node (e.g., a MT part of the IAB node and/or a DU part of the IAB node) may transmit data to a first parent node via a first link and to a second parent node via a second link. The first link may be a default link and the second link may be a secondary link. The WTRU or the IAB node may receive configuration information associated with a BH RLC channel (e.g., for an IAB node) or a bearer (e.g., for a WTRU). The configuration information may include a set of split buffer thresholds (e.g., multiple buffer thresholds, such as a first buffer threshold and a second buffer threshold) and corresponding remaining PDBs (e.g., the first buffer threshold may be associated with a first remaining PDB range and the second buffer threshold may be associated with a second remaining PDB range). The WTRU or IAB node may receive a packet and determine a remaining PDB of the packet. The WTRU or IAB node may choose the current/instantaneous split buffer threshold (e.g., the first buffer threshold or the second buffer threshold) to apply (e.g., select) based on the remaining PDB of the packet in consideration. In examples, the WTRU may be configured with values (e.g., {[5 ms, 0 bytes], [10 ms, 1600 bytes], [15 ms, 3200 bytes], [20 ms, 6400 bytes], [25 ms, infinity]}). The values indicate to the WTRU that if the remaining PDB range of a packet is below a value (e.g., 5 ms or below), the uplink split buffer threshold (e.g., the first buffer threshold) for the concerned bearer may be 0 bytes. If the PDB range of a packet is above a value (e.g., above 5 ms or between 5 and 10 ms) the uplink split buffer threshold (e.g., the second buffer threshold) may be 1600 bytes, etc. The WTRU or IAB node may choose the uplink buffer split threshold to use (e.g., the first buffer threshold or the second buffer threshold) based on the determined remaining PDB of the packet. If the uplink split buffer threshold (e.g., the first buffer threshold or the second buffer threshold) is chosen based on the remaining PDB of the packet, the following may apply. If the amount of data in a current (e.g., UL) buffer level associated with the bearer (e.g., for the WTRU) or BH RLC channel (e.g., for the IAB node) is above the (e.g., selected) split buffer threshold (e.g., first buffer threshold or the second buffer threshold), the WTRU may try to transmit the packet via the link (e.g., of the first link or the second link) that schedules the WTRU first (e.g., that provides resources first).

Scaling values may be specified for the buffer threshold (e.g., the first buffer threshold or the second buffer threshold) (e.g., instead of a set of remaining packet PDB to split buffer threshold mapping). The scaling values specified for the buffer threshold (e.g., the first buffer threshold or the second buffer threshold) may be dependent on the remaining PDB. In examples, the WTRU may be configured with the values of [15 ms, 3200 bytes] and may be configured to scale the buffer threshold level (e.g., the first buffer threshold or the second buffer threshold) up or down depending on how much the remaining PDB is as compared to 15 ms. The WTRU may be configured to scale the split buffer threshold (e.g., first buffer threshold or the second buffer threshold) up or down by the same percentage amount as the ratio of the remaining PDB and the specified 15 ms.

The split buffer threshold (e.g., the multiple buffer thresholds, such as the first buffer threshold and the second buffer threshold) may be associated with the packet on flight time (e.g., instead of the remaining PDB). The scaling of the buffer threshold (e.g., the first buffer threshold or the second buffer threshold) may be based on a remaining PDB or on a flight time specific to a given bearer (e.g., for a WTRU) or a BH RLC channel (e.g., for an IAB node). The scaling of the buffer threshold (e.g., the first buffer threshold or the second buffer threshold) may be based on a remaining PDB or on a flight time applicable to multiple WTRU bearers (e.g., all WTRU bearers) or multiple BH RLC channels (e.g., all BH RLC channels). The scaling of the buffer threshold (e.g., the first buffer threshold or the second buffer threshold) may be based on a remaining PDB or on a flight time applicable to a subset of the WTRU bearers or a subset of the BH RLC channels.

Examples related to packet duplication based on remaining PDB and remaining expected latency are provided herein.

A WTRU (e.g., a WTRU operating in a multi-hop IAB node) or an IAB node (e.g., a MT part of the IAB node and/or a DU part of the IAB node) that has multiple parents (e.g., a first parent and a second part node) may be configured to adapt the duplication behavior of packets. The duplication behavior of packets may be dependent on the remaining PDB and/or the remaining expected latency on the path to the donor. Examples herein may allow the dynamic use of publication based on the needs of that particular packet (e.g., how much delay budget that packet has left), e.g., as opposed to an approach of duplication that is based on semi static configuration information applicable at bearer level. The WTRU or IAB node may transmit data to a first parent node via a first link and to a second parent node via a second link. The first link may be default link and the second link may be a secondary link. The WTRU or IAB node may receive configuration information associated with a BH RLC channel (e.g., for an IAB node) or a bearer (e.g., for a WTRU). The configuration information may include a remaining PDB threshold. The WTRU or IAB node may receive a packet and determine the remaining PDB associated with the packet. The WTRU or the IAB node may attempt to duplicate and transmit the packet via both parents (e.g., via both the first link associated with the first parent node and the second link associated with the second parent node) if the packet has a short (e.g., below the remaining PDB threshold) remaining PDB. This may increase/maximize the possibility that the packet will arrive at the destination before the delay budget expires. The IAB node or WTRU may send a scheduling request (SR) or buffer status report (BSR) to the first parent node if resources are not available on the first link and may send a SR or BSR to the second parent node if resources are not available on the second link.

The WTRU or the IAB node may receive a threshold corresponding to the remaining PDB. If the remaining PDB is below the remaining PDB threshold, the WTRU or IAB node may duplicate and send the packet (e.g., PDCP packet, BAP packet, etc.) over both links (e.g., via both the first link associated with the first parent node and the second link associated with the second parent node). A WTRU or an IAB node that is operating in CA mode with a given parent (e.g., the first parent node or the second part node) may be configured to adapt the duplication behavior of packets. The duplication behavior of packets may be dependent on the remaining PDB and/or the remaining expected latency on the path to the donor. The WTRU or the IAB node may receive a threshold corresponding to the remaining PDB. If the remaining PDB is below the remaining PDB threshold, the WTRU or IAB node may duplicate and send the packet (e.g., PDCP packet, BAP packet, etc.) over both carriers.

The duplication behavior may be associated with a threshold corresponding to the packet or on flight time (e.g., instead of the remaining PDB). The threshold for triggering duplication based on the remaining PDB or on flight time may be specific to a given (e.g., for a WTRU) bearer or a BH RLC channel (e.g., for an IAB node). The threshold for triggering duplication based on the remaining PDB or on flight time may be applicable to multiple WTRU bearers (e.g., all WTRU bearers) or multiple BH RLC channels (e.g., all BH RLC channels). The threshold for triggering duplication based on the remaining PDB or on flight time may be specific to a given subset of WTRU bearers or subset of BH RLC channels.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A device, comprising:

a processor configured to:

transmit data to a first parent node via a first link and to a second parent node via a second link;

receive configuration information associated with a bearer or a backhaul radio link control (BH RLC) channel, wherein:

the configuration information indicates a first buffer threshold and a second buffer threshold, the first buffer threshold is associated with a first remaining packet delay budget (PDB) range and the first link, and the second buffer threshold is associated with a second remaining PDB range and the second link;

receive a packet and determine a remaining PDB associated with the packet;

select a buffer threshold based on the configuration information and the determined remaining PDB associated with the packet, wherein the selected buffer threshold is the first buffer threshold or the second buffer threshold; and transmit the packet, wherein the packet is transmitted:

via the first link if the selected buffer threshold is the first buffer threshold, or via the second link if the selected buffer threshold is the second buffer threshold.

2. The device of claim 1, wherein the device is an integrated access and backhaul (IAB) node.

3. The device of claim 2, wherein the device is a mobile termination (MT) part of the IAB node or a distributed unit (DU) part of the IAB node.

4. The device of claim 1, wherein the device is a wireless transmit/receive unit (WTRU).

5. The device of claim 4, wherein the WTRU is comprised in a multi-hop IAB node.

6. The device of claim 1, wherein the first link is a default link and the second link is a secondary link.

7. The device of claim 1, wherein the first remaining PDB range is below a value and the second remaining PDB range is above the value.

8. A method implemented within a device, the method comprising:

transmitting data to a first parent node via a first link and to a second parent node via a second link;

receiving configuration information associated with a bearer or a backhaul radio link control (BH RLC) channel, wherein:

the configuration information indicates a first buffer threshold and a second buffer threshold, the first buffer threshold is associated with a first remaining packet delay budget (PDB) range and the first link, and the second buffer threshold is associated with a second remaining PDB range and the second link;

receiving a packet and determine a remaining PDB associated with the packet;

selecting a buffer threshold based on the configuration information and the determined remaining PDB associated with the packet, wherein the selected buffer threshold is the first buffer threshold or the second buffer threshold; and transmitting the packet, wherein the packet is transmitted:

via the first link if the selected buffer threshold is the first buffer threshold, or via the second link if the selected buffer threshold is the second buffer threshold.

9. The method of claim 8, wherein the device is an integrated access and backhaul (IAB) node.

10. The method of claim 9, wherein the device is a mobile termination (MT) part of the IAB node or a distributed unit (DU) part of the IAB node.

11. The method of claim 8, wherein the device is a wireless transmit/receive unit (WTRU).

12. The method of claim 11, wherein the WTRU is operating in a multi-hop IAB node.

13. The method of claim 8, wherein the first link is a default link and the second link is a secondary link.

14. The method of claim 8, wherein the first remaining PDB range is below a value and the second remaining PDB range is above the value.

15. A device, comprising:

a processor configured to:

transmit data to a first parent node via a first link and to a second parent node via a second link;

receive configuration information associated with a bearer or a backhaul radio link control (BH RLC) channel, wherein the configuration information indicates a remaining packet delay budget (PDB) threshold;

receive a packet and determine a remaining PDB associated with the packet; and based on the determined remaining PDB associated with the packet being less than the remaining PDB threshold, duplicate the packet, and transmit the packet to the first parent node via both the first link and the duplicated packet to the second parent node via the second link.

16. The device of claim 15, wherein the processor is further configured to:

send a scheduling request (SR) or buffer status report (BSR) to the first parent node if resources are not available on the first link; and send an SR or a BSR to the second parent node if resources are not available on the second link.

17. The device of claim 15, wherein the device is an integrated access and backhaul (IAB) node.

18. The device of claim 17, wherein the device is a mobile termination (MT) part of the IAB node or a distributed unit (DU) part of the IAB node.

19. The device of claim 15, wherein the device is a wireless transmit/receive unit (WTRU).

20. The device of claim 19, wherein the WTRU is operating in a multi-hop IAB node.

* * * * *